(12) United States Patent
Finkelstein

(10) Patent No.: US 10,880,001 B2
(45) Date of Patent: Dec. 29, 2020

(54) SYSTEM, METHODS, AND DEVICES FOR DISTRIBUTED PHYSICAL LAYER NETWORKS

(71) Applicant: COX COMMUNICATIONS, INC., Atlanta, GA (US)

(72) Inventor: Jeffrey L. Finkelstein, Atlanta, GA (US)

(73) Assignee: Cox Communications, Inc., Atlanta, GA (US)

(*) Notice: Subject to any disclaimer, the term of this patent is extended or adjusted under 35 U.S.C. 154(b) by 0 days.

(21) Appl. No.: 15/876,840

(22) Filed: Jan. 22, 2018

(65) Prior Publication Data

US 2018/0145746 A1 May 24, 2018

Related U.S. Application Data

(63) Continuation-in-part of application No. 15/287,858, filed on Oct. 7, 2016.

(51) Int. Cl.
*H04L 12/28* (2006.01)
*H04L 12/54* (2013.01)
(Continued)

(52) U.S. Cl.
CPC ......... *H04B 7/2612* (2013.01); *H04L 1/0003* (2013.01); *H04L 1/1812* (2013.01);
(Continued)

(58) Field of Classification Search
CPC .. H04L 1/0003; H04L 1/1812; H04W 28/065; H04W 80/02; H04W 80/06; H04B 7/2612
See application file for complete search history.

(56) References Cited

U.S. PATENT DOCUMENTS 8,411,798 B2 * 4/2013 Sahai ................ H04W 52/0229
375/324
8,780,927 B2 * 7/2014 Julien ................... H04L 49/351
370/359

(Continued)

OTHER PUBLICATIONS

DOCSIS remote PHY by John Chapman, Oct. 2013, by John Chapman, Cisco (Year: 2013).*

(Continued)

*Primary Examiner* — Maharishi V Khirodhar
(74) *Attorney, Agent, or Firm* — Eversheds-Sutherland (US) LLP

(57) ABSTRACT

Embodiments of the disclosure provide application layer, Medium Access Control (MAC) layer, and physical (PHY) layer functionality by discrete devices, to form a distributed MAC/PHY architecture for communications networks. An application layer (layer-3) device can communicate with a MAC layer (layer-2) device. The layer-2 device may switch IP layer (layer-3) information to MAC layer information. Further the layer-2 device can use addressing information determined or received from the layer-3 device to choose a particular PHY layer (layer-1) device. The layer-2 device can instruct the layer-1 device, to modulate information on one or more frequencies and/or wavelengths over a given physical medium. In an embodiment, the various communications between the devices can occur using a downstream external PHY interface (DEPI) protocol and an upstream external PHY interface (UEPI) protocol. In an embodiment, the monitoring of the devices can be performed using a management plane generic control plane (GCP) protocol.

24 Claims, 15 Drawing Sheets

(51) Int. Cl.
*H04B 7/26* (2006.01)
*H04L 1/00* (2006.01)
*H04W 28/06* (2009.01)
*H04L 1/18* (2006.01)
*H04L 29/06* (2006.01)
*H04W 80/06* (2009.01)
*H04W 80/02* (2009.01)

(52) U.S. Cl.
CPC .......... *H04L 69/08* (2013.01); *H04W 28/065* (2013.01); *H04W 80/02* (2013.01); *H04W 80/06* (2013.01)

(56) References Cited

U.S. PATENT DOCUMENTS

| | | | | |
|---|---|---|---|---|
| 10,057,102 B1* | 8/2018 | Propp | ................... | H04L 1/0045 |
| 2006/0271988 A1* | 11/2006 | Chapman | ............ | H04L 12/2801 |
| | | | | 725/111 |
| 2009/0232111 A1* | 9/2009 | Li | ........................ | H04J 3/0682 |
| | | | | 370/337 |
| 2009/0300328 A1* | 12/2009 | Raju | ................... | H04W 28/065 |
| | | | | 712/204 |
| 2010/0115316 A1* | 5/2010 | Diab | ..................... | G06F 1/3234 |
| | | | | 713/323 |
| 2010/0284451 A1* | 11/2010 | Murari | .................. | G06F 13/385 |
| | | | | 375/220 |
| 2015/0296057 A1* | 10/2015 | Ohana | ................... | H04L 69/323 |
| | | | | 370/437 |
| 2016/0211983 A1* | 7/2016 | Zhang | ................. | H04L 12/2801 |
| 2016/0286011 A1* | 9/2016 | Kasher | .................... | H04L 69/22 |
| 2017/0244577 A1* | 8/2017 | Patrick | ................ | H04L 12/2801 |
| 2017/0303159 A1* | 10/2017 | Ma | ..................... | H04W 28/0289 |
| 2017/0374490 A1* | 12/2017 | Schoppmeier | .......... | H04W 4/70 |
| 2018/0020378 A1* | 1/2018 | Tsuboi | .................. | H04W 74/08 |

OTHER PUBLICATIONS

The wideband protocol for DOCSIS network, 2005, by john chapman (Year: 2005).*

Data-Over-Cable Service Interface Specifications DCA, Distributed CCAP Architectures Overview Technical Report, CM-TR-DCA-V01-150908, 2015: (Year: 2015).*

DOCSIS 3.1 ( Data-Over-Cable Service Interface Specifications DOCSIS® 3.1 MAC and Upper Layer Protocols Interface Specification, Jun. 2, 2016) (Year: 2016).*

2016 Spring technical Forum ("moving on UP: Remote PHY and what it means for the future of networking", May 17, 2016) (Year: 2016).*

* cited by examiner

SYSTEM, METHODS, AND DEVICES FOR DISTRIBUTED PHYSICAL LAYER NETWORKS

CROSS-REFERENCE TO RELATED APPLICATION(S)

This application is a continuation-in-part of U.S. Non-Provisional application Ser. No. 15/287,858, filed Oct. 7, 2016, the disclosure of which is incorporated herein by reference as if set forth in full.

BACKGROUND

The Open Systems Interconnection model (OSI model) can refer to a model that characterizes and standardizes one or more communication functions of a network. In some aspects, the model may disregard some aspects of the network's underlying internal structure and specific implementation technology. In some implementations, the layers encompassing the functionality of the various aspects of the OSI model of the communications network may be performed by a single device, for example, using processors and memory manipulations configured to execute respective layer functionality.

BRIEF DESCRIPTION OF THE DRAWINGS

Figure 1:
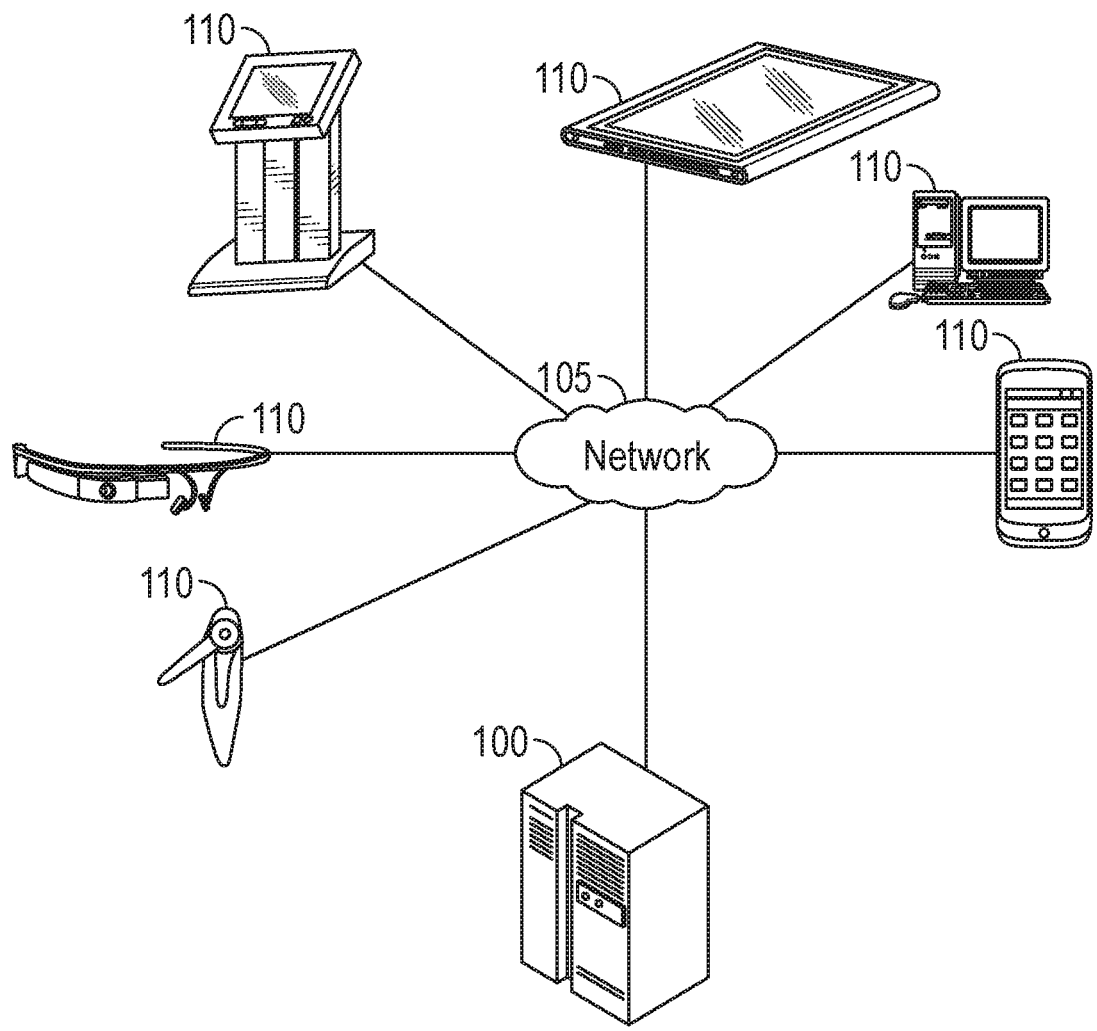
Figure 2:
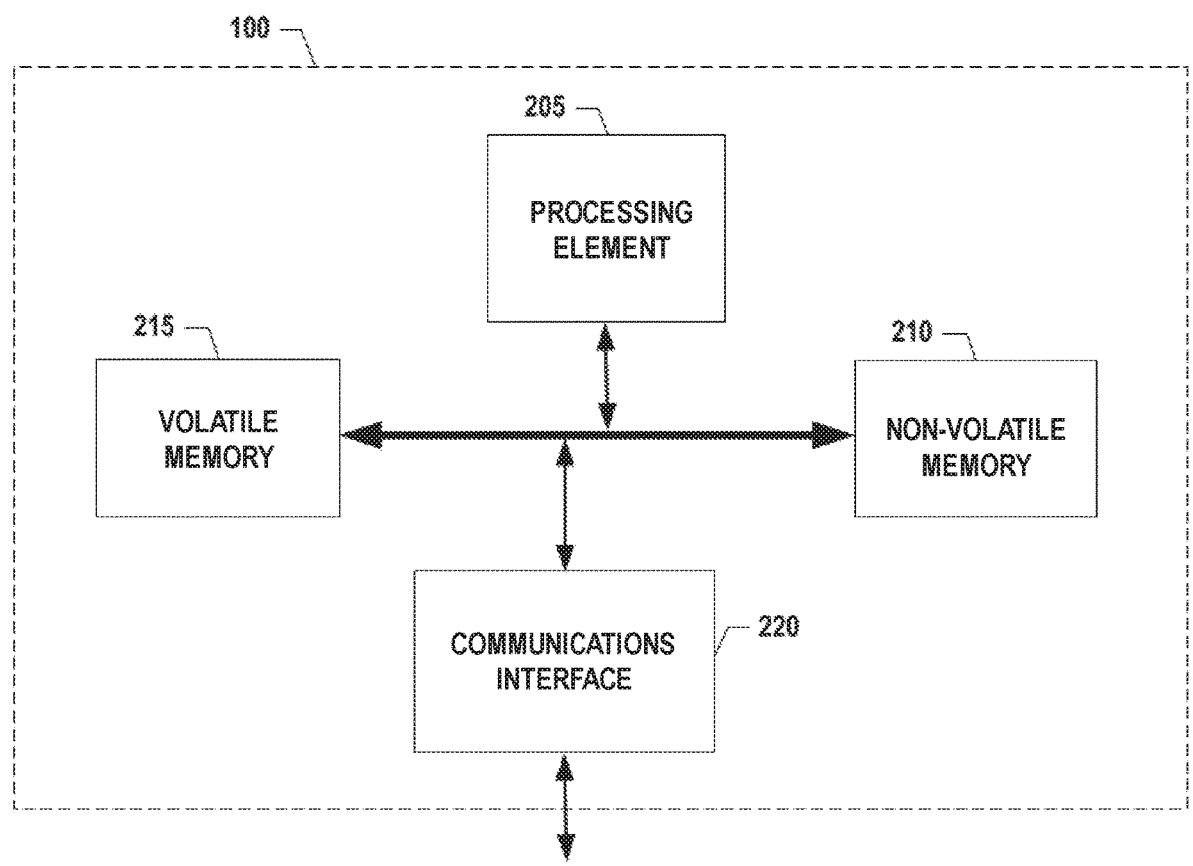
Figure 3:
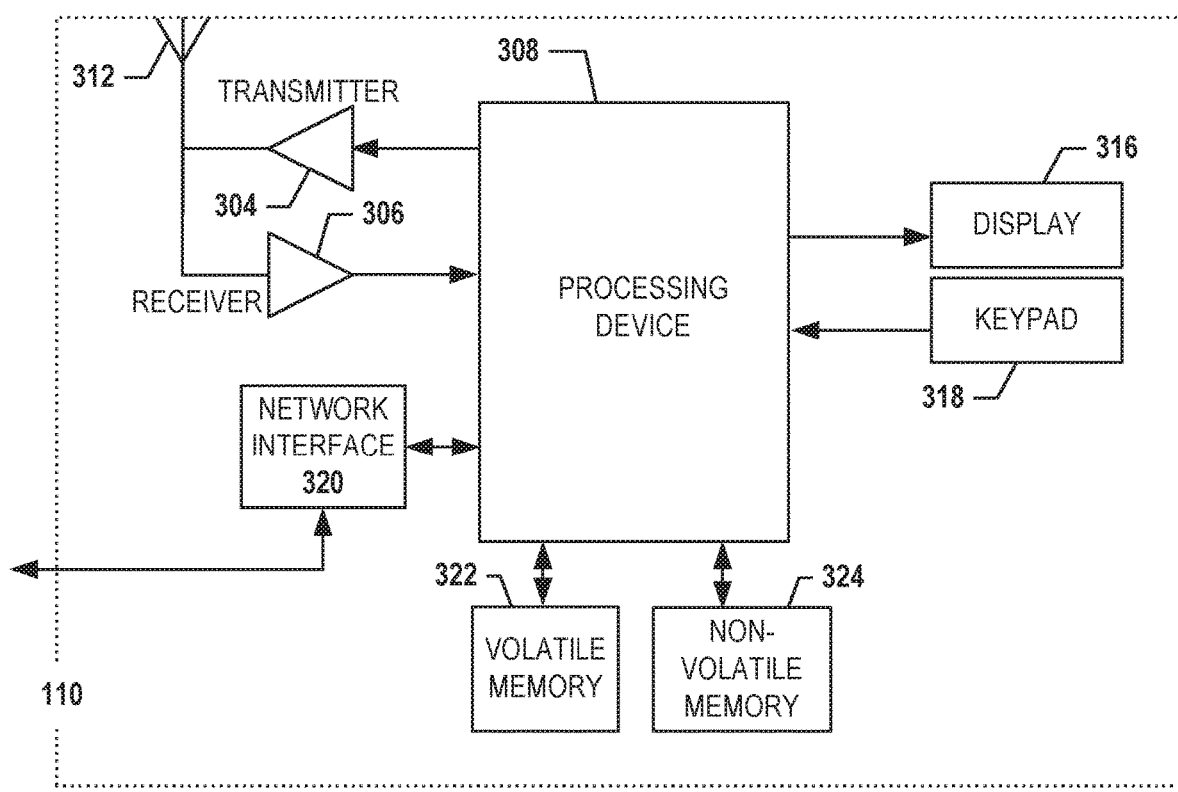
Figure 4A:
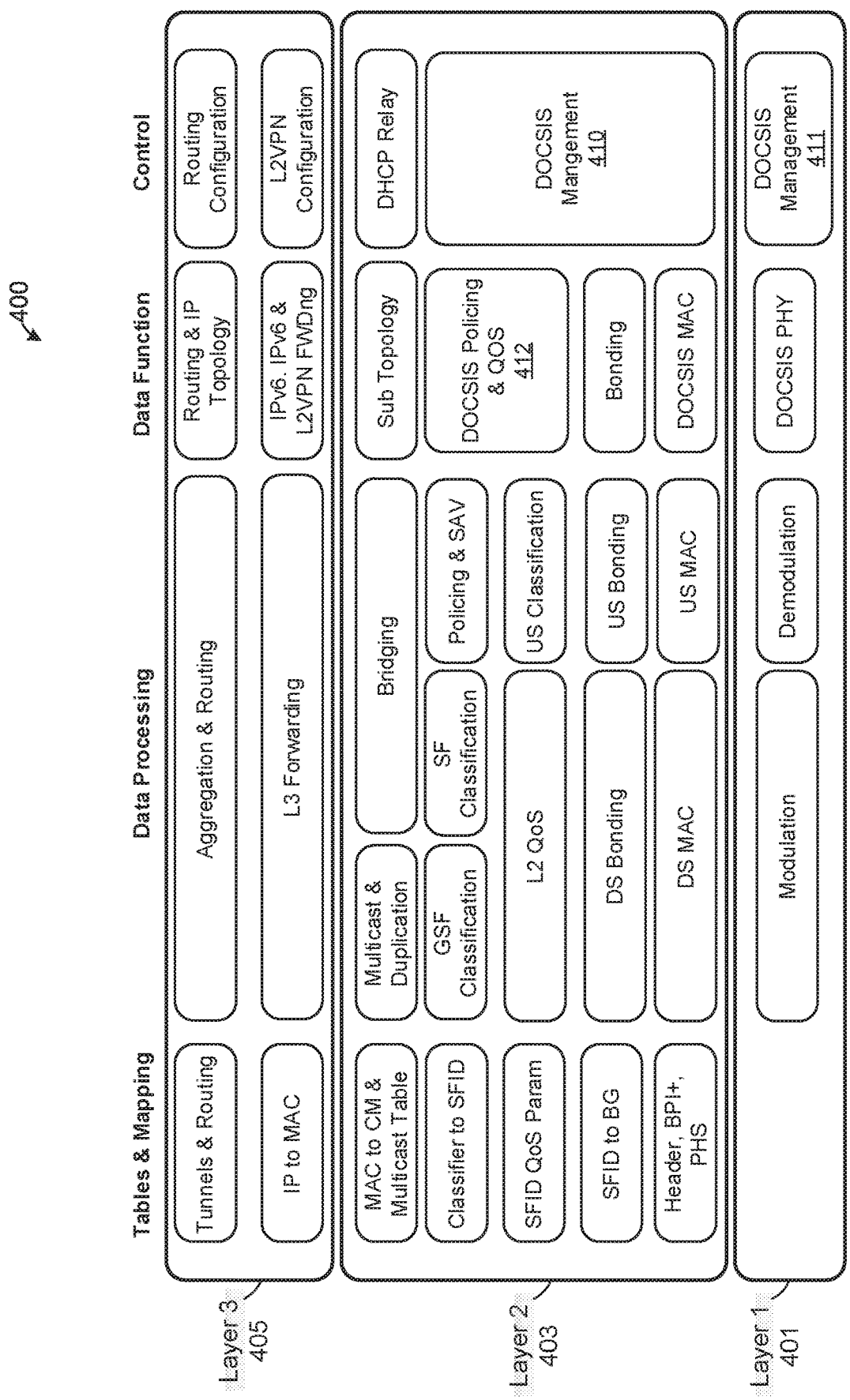
Figure 4B:
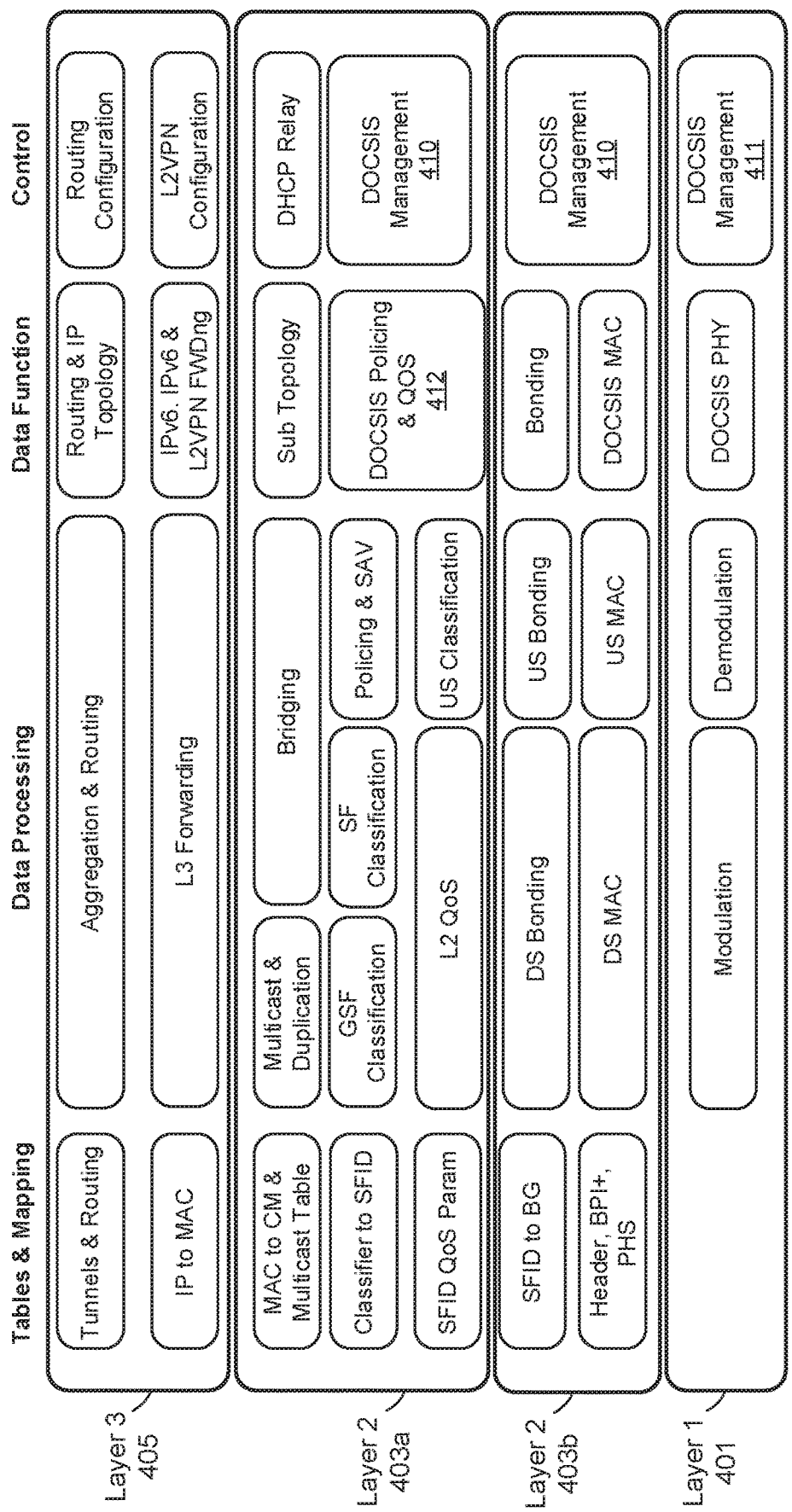
Figure 5A:
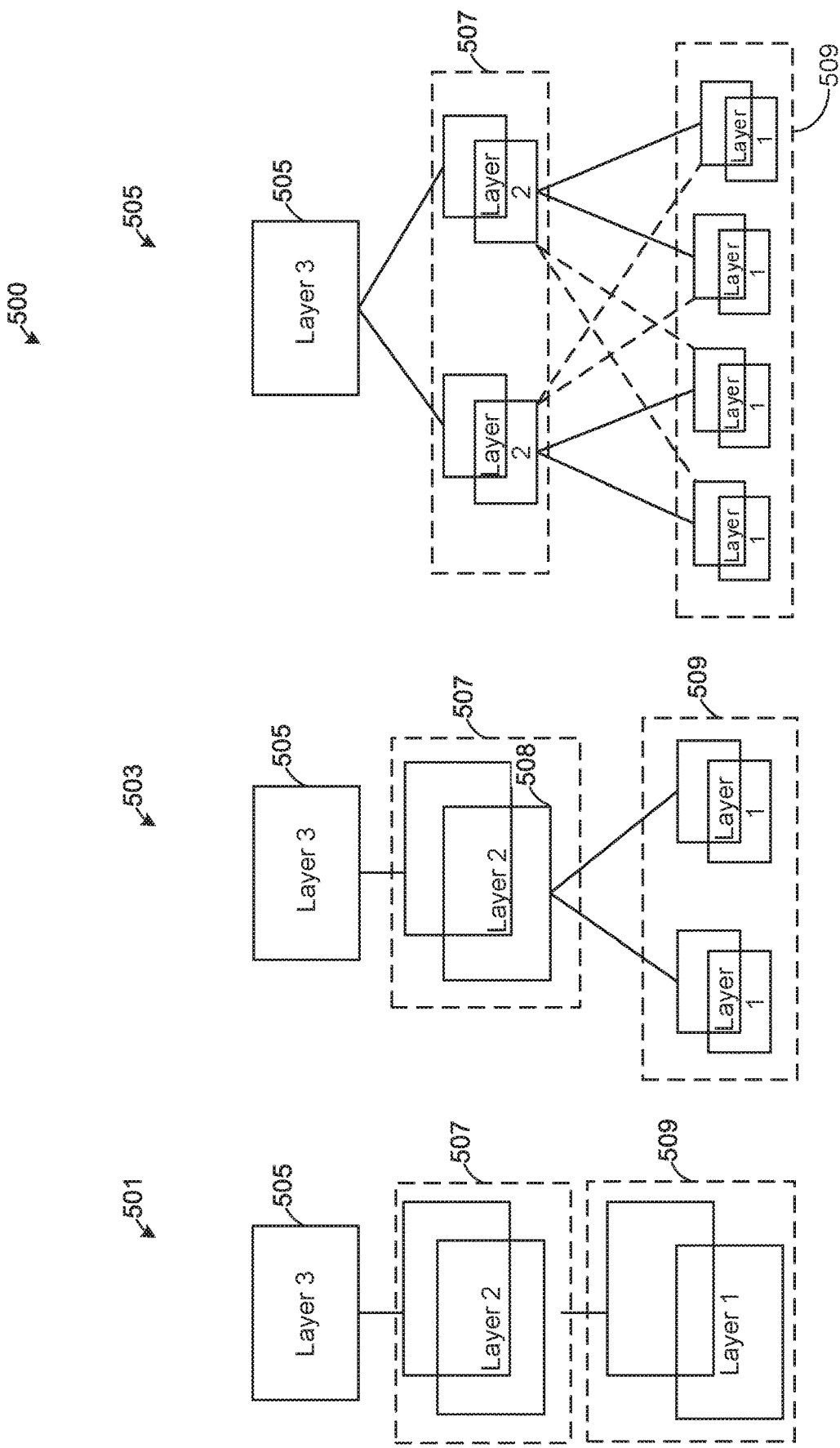
Figure 5B:
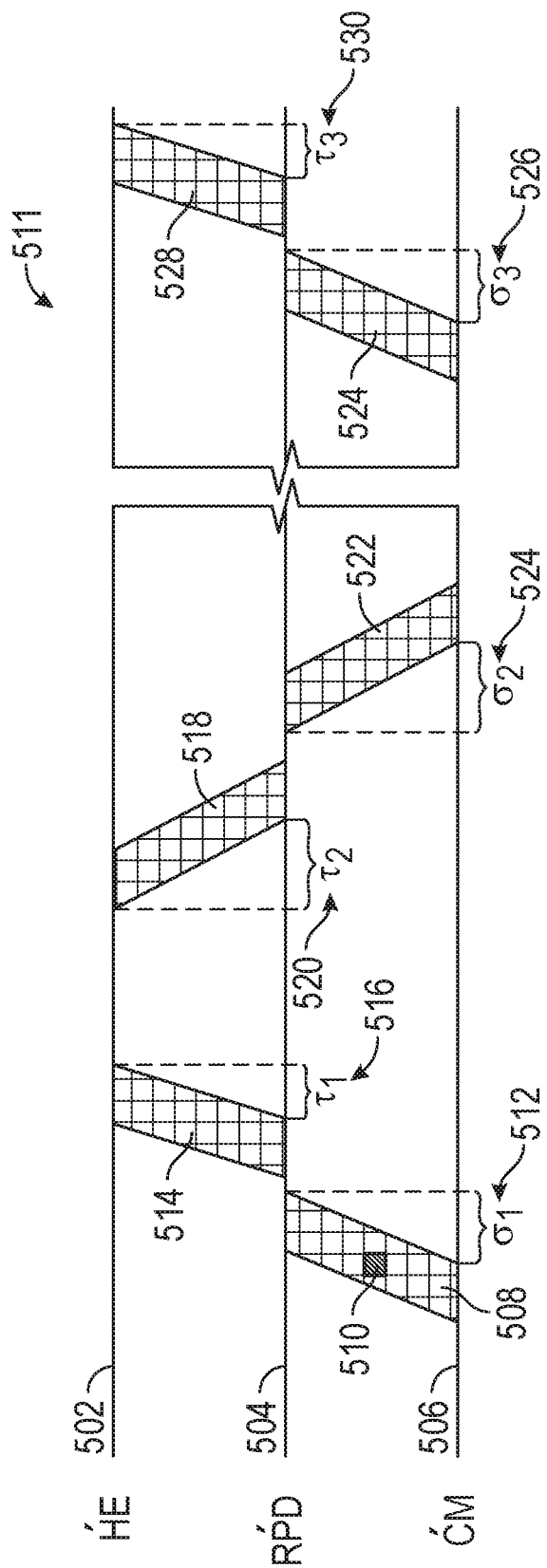
Figure 5C:
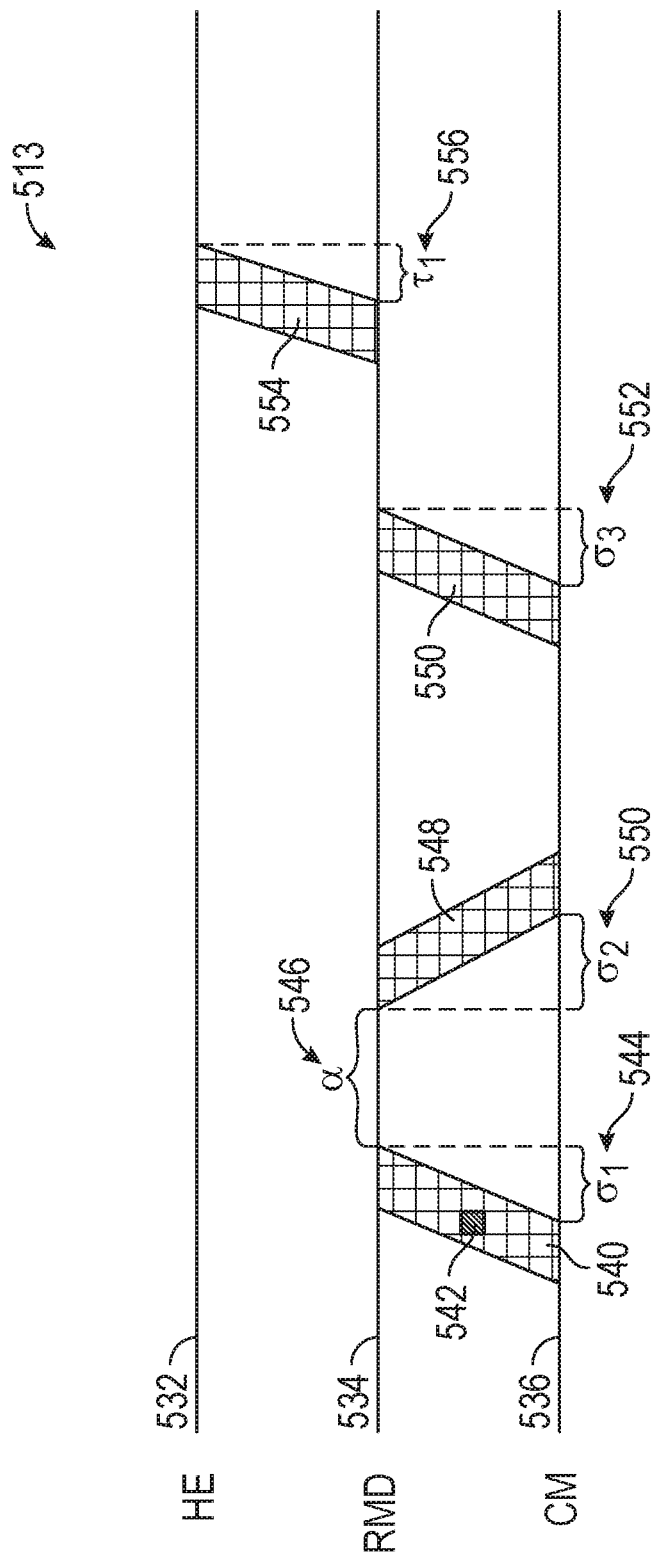
Figure 7A:
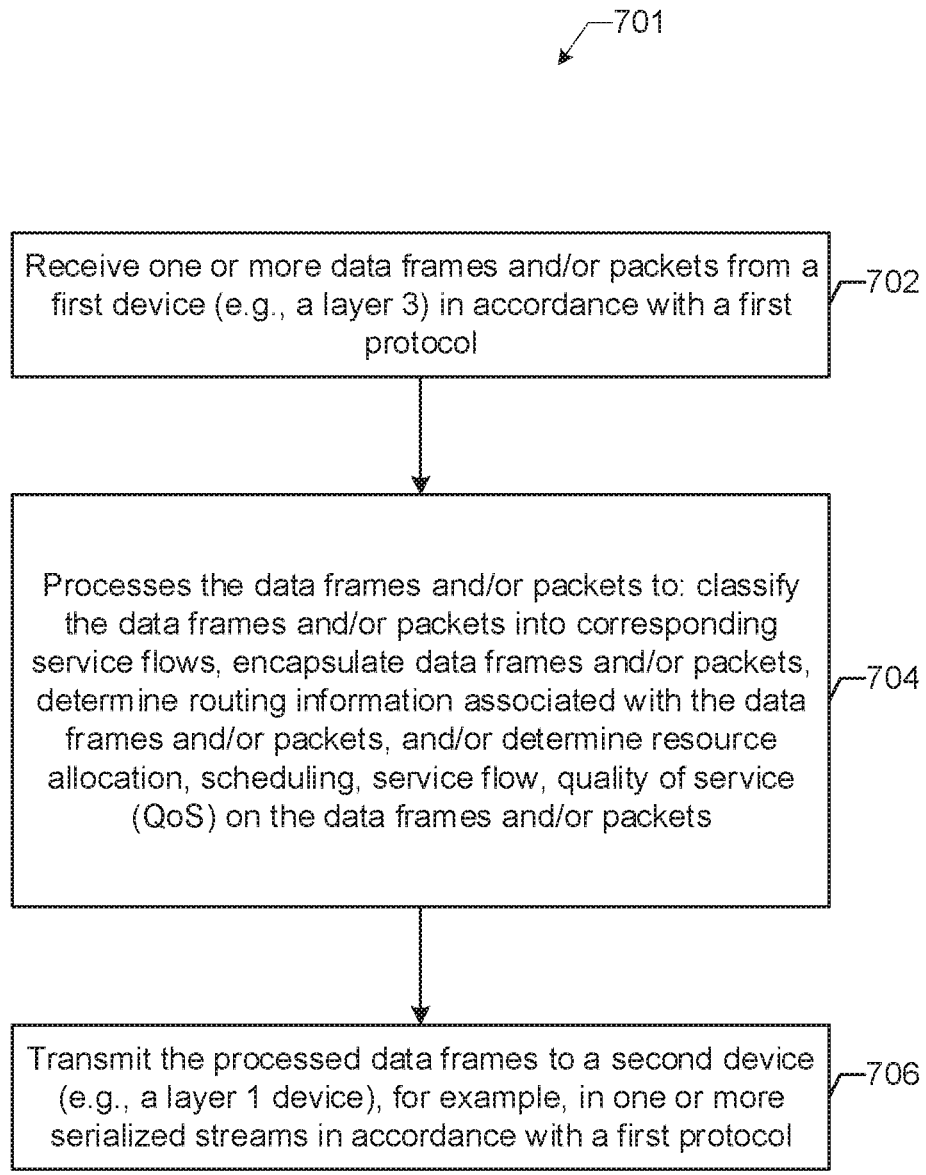
Figure 7B:
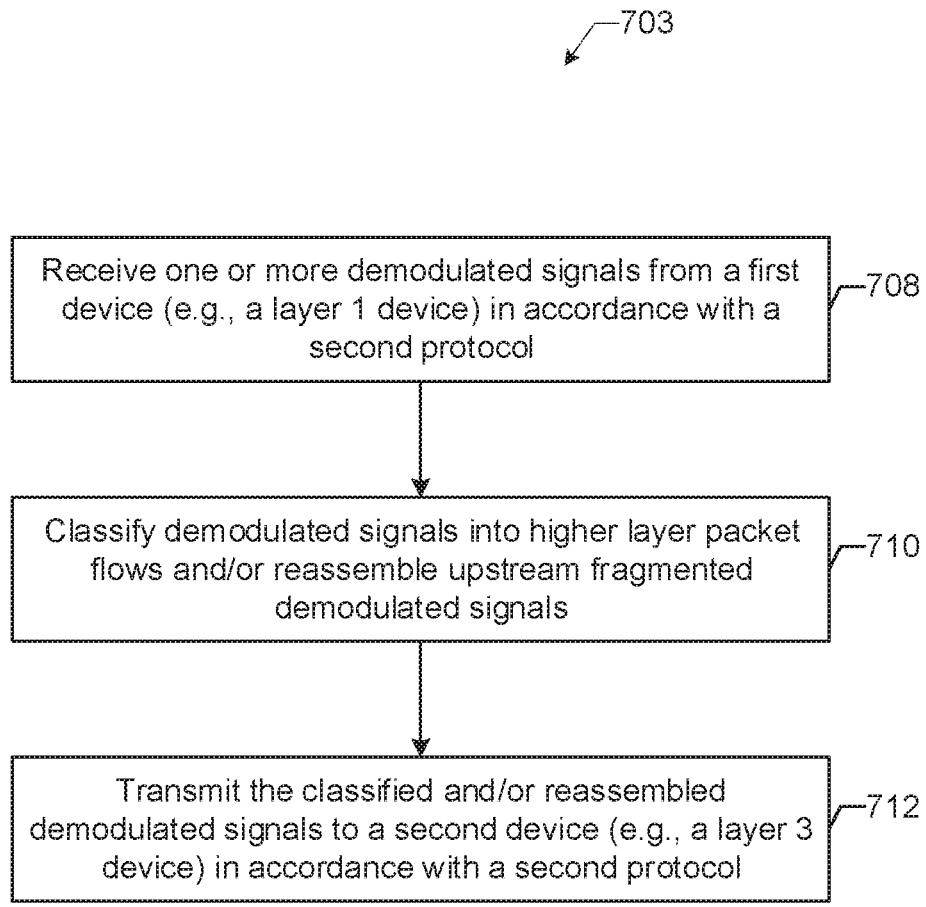
Figure 8A:
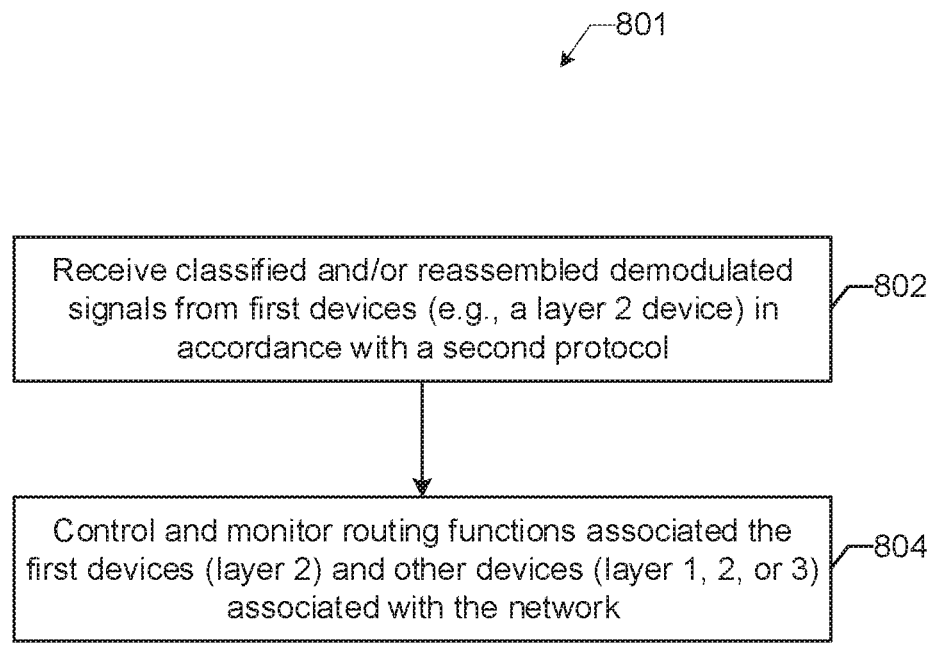
Figure 8B:
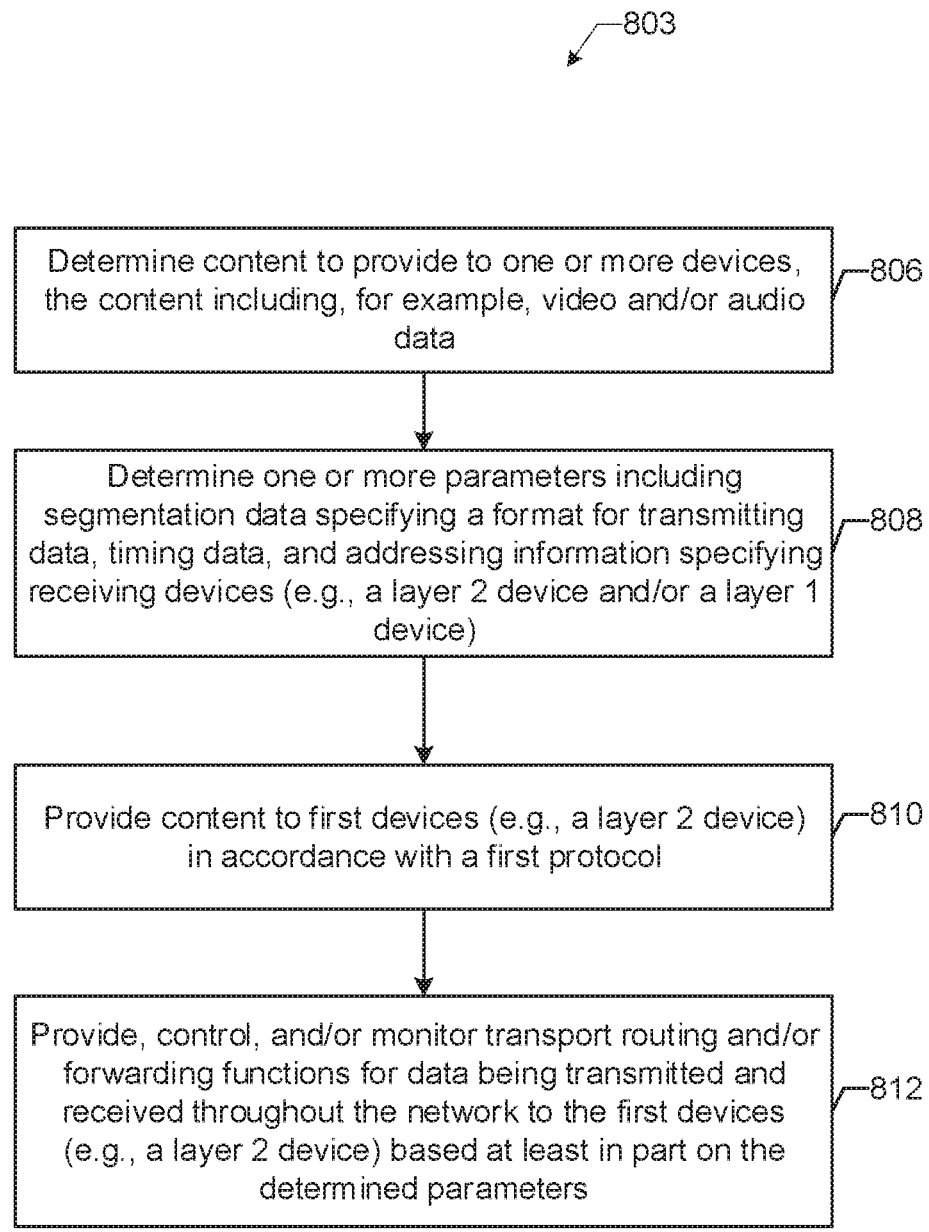
Figure 9:
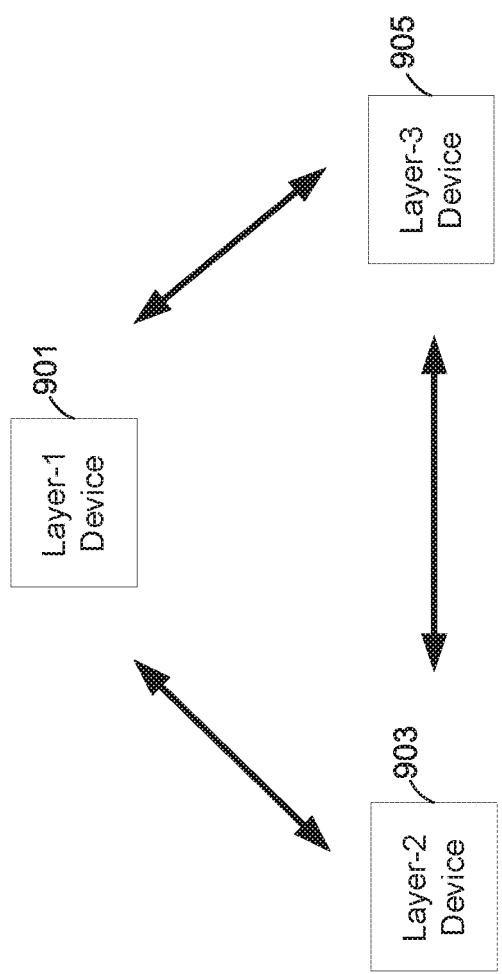

Having thus described the disclosure in general terms, reference will now be made to the accompanying drawings, which may not necessarily be drawn to scale, and wherein:

FIG. 1 is an overview of a system that can be used to practice embodiments of the present disclosure;

FIG. 2 is an example schematic diagram of a management computing entity according to one embodiment of the present disclosure;

FIG. 3 is an example schematic diagram of a user device according to one embodiment of the present disclosure;

FIG. 4A shows an example schematic diagram of an example system that may be represented by an Open Systems Interconnection (OSI) model in accordance with example embodiments of the disclosure;

FIG. 4B shows another example schematic diagram of an example system that may be represented by the OSI model in accordance with example embodiments of the disclosure;

FIG. 5A shows a diagram of example network architectures in accordance with example embodiments of the disclosure;

FIG. 5B shows an example timing diagram associated with the disclosed network architectures in accordance with example embodiments of the disclosure;

FIG. 5C shows another example timing diagram associated with the disclosed network architectures in accordance with example embodiments of the disclosure;

FIGS. 6A-8B show flow charts illustrating various example procedures and operations that may be performed, in accordance with various embodiments of the disclosure; and FIG. 9 shows a diagram of an example environment at which one or more devices may operate, in accordance with various embodiments of the disclosure.

DETAILED DESCRIPTION OF VARIOUS EMBODIMENTS

This specification relates system and method for providing distributed physical layer networks.

In general, one innovative aspect of the subject matter described herein can be embodied in methods that include the actions of modulating and demodulating signals, by one or more first devices, for transmission over a network, the first devices being in communication with one or more second devices; and transferring data packets, by the one or more second devices, to the one or more first devices and receiving data packets from the one or more first devices, wherein the second devices provide instructions to the one or more first devices to modulate signals according to particular parameters, the instructions further comprising addressing information specifying a destination for the signals.

Other embodiments of this aspect include corresponding systems, apparatus, and computer programs, configured to perform the actions of the methods, encoded on computer storage devices.

These and other embodiments can each optionally include one or more of the following features. Controlling and monitoring, by one or more processors of third devices in communication with the processors of the one or more second devices, routing functions associated with the network. Demodulating signals and providing data associated with the demodulated signals, by the processors of the first one or more devices, to the one or more second devices.

Other embodiments of this aspect include corresponding systems, apparatus, and computer programs, configured to perform the actions of the methods, encoded on computer storage devices.

Particular embodiments of the subject matter described herein can be implemented so as to realize one or more of the following advantages. Improve network stability and operational data transfer rates and, in turn, improve the user experience. Reduce the costs associated with routing network traffic, network maintenance, network upgrades, and/or the like. Embodiments of the claimed subject matter also allows for flexible placement of devices incorporating different functionality associated with an OSI model. For example, a device incorporating functionality of layer 1 may be placed a distance from a device incorporating functionality of layer 2, and each may be upgraded independently.

The details of one or more embodiments of the subject matter described herein are set forth in the accompanying drawings and the description below. Other features, aspects, and advantages of the subject matter will become apparent from the description, the drawings, and the claims.

Various embodiments of the present disclosure now will be described more fully hereinafter with reference to the accompanying drawings, in which some, but not all embodiments are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Like numbers refer to like elements throughout. Arrows in each of the figures depict bi-directional data flow and/or bi-directional data flow capabilities. The terms "path," "pathway" and "route" are used interchangeably herein.

I. Computer Program Products, Methods, and Computing Entities

Embodiments of the present disclosure may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (for example a solid state drive (SSD)), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (for example Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (for example the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. Example System Architecture

FIG. 1 provides an illustration of an example embodiment of the present disclosure. As shown in FIG. 1, this particular embodiment may include one or more management computing entities 100, one or more networks 105, and one or more user devices 110. Each of these components, entities, devices, systems, and similar words used herein interchangeably may be in direct or indirect communication with, for example, one another over the same or different wired or wireless networks. Additionally, while FIG. 1 illustrates the various system entities as separate, standalone entities, the various embodiments are not limited to this particular architecture.

1. Example Management Computing Entity

FIG. 2 provides a schematic of a management computing entity 100 according to one embodiment of the present disclosure. In general, the terms computing entity, computer, entity, device, system, and/or similar words used herein interchangeably may refer to, for example, one or more computers, computing entities, desktop computers, mobile phones, tablets, phablets, notebooks, laptops, distributed systems, gaming consoles (for example Xbox, Play Station, Wii), watches, glasses, iBeacons, proximity beacons, key fobs, radio frequency identification (RFID) tags, ear pieces, scanners, televisions, dongles, cameras, wristbands, wearable items/devices, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the management computing entity 100 may also include one or more communications interfaces 220 for communicating with various computing entities, such as by communicating data, content, information, and/or similar terms used herein interchangeably that can be transmitted, received, operated on, processed, displayed, stored, and/or the like. For instance, the management computing entity 100 may communicate with user devices 110 and/or a variety of other computing entities.

As shown in FIG. 2, in one embodiment, the management computing entity 100 may include or be in communication with one or more processing elements 205 (also referred to as processors, processing circuitry, and/or similar terms used herein interchangeably) that communicate with other elements within the management computing entity 100 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In one embodiment, the management computing entity 100 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity—relationship model, object model, document model, semantic model, graph model, and/or the like.

In one embodiment, the management computing entity 100 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the management computing entity 100 with the assistance of the processing element 205 and operating system.

As indicated, in one embodiment, the management computing entity 100 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the management computing entity 100 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1X (1xRTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol.

Although not shown, the management computing entity 100 may include or be in communication with one or more input elements, such as a keyboard input, a mouse input, a touch screen/display input, motion input, movement input, audio input, pointing device input, joystick input, keypad input, and/or the like. The management computing entity 100 may also include or be in communication with one or more output elements (not shown), such as audio output, video output, screen/display output, motion output, movement output, and/or the like.

As will be appreciated, one or more of the management computing entity's 100 components may be located remotely from other management computing entity 100 components, such as in a distributed system. Furthermore, one or more of the components may be combined and additional components performing functions described herein may be included in the management computing entity 100. Thus, the management computing entity 100 can be adapted to accommodate a variety of needs and circumstances. As will be recognized, these architectures and descriptions are provided for example purposes only and are not limiting to the various embodiments.

2. Example User Device

A user may be an individual, a family, a company, an organization, an entity, a department within an organization, a representative of an organization and/or person, and/or the like. In one example, users may be employees, residents, customers, and/or the like. For instance, a user may operate a user device 110 that includes one or more components that are functionally similar to those of the management computing entity 100. FIG. 3 provides an illustrative schematic representative of a user device 110 that can be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (for example Xbox, Play Station, Wii), watches, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. User devices 110 can be operated by various parties. As shown in FIG. 3, the user device 110 can include an antenna 312, a transmitter 304 (for example radio), a receiver 306 (for example radio), and a processing element 308 (for example CPLDs, microprocessors, multi-core processors, coprocessing entities, ASIPs, microcontrollers, and/or controllers) that provides signals to and receives signals from the transmitter 304 and receiver 306, respectively.

The signals provided to and received from the transmitter 304 and the receiver 306, respectively, may include signaling information in accordance with air interface standards of applicable wireless systems. In this regard, the user device 110 may be capable of operating with one or more air interface standards, communication protocols, modulation types, and access types. More particularly, the user device 110 may operate in accordance with any of a number of wireless communication standards and protocols, such as those described above with regard to the management computing entity 100. In a particular embodiment, the user device 110 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the user device 110 may operate in accordance with multiple wired communication standards and protocols, such as those described above with regard to the management computing entity 100 via a network interface 320.

Via these communication standards and protocols, the user device 110 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The user device 110 can also download changes, add-ons, and updates, for instance, to its firmware, software (for example including executable instructions, applications, program modules), and operating system.

According to one embodiment, the user device 110 may include location determining aspects, devices, modules, functionalities, and/or similar words used herein interchangeably. For example, the user device 110 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information can be determined by triangulating the user device's 110 position in connection with a variety of other systems, including cellular towers, Wi-Fi access points, and/or the like. Similarly, the user device 110 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (for example smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The user device 110 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the user device 110 to interact with and/or cause display of information from the management computing entity 100, as described herein. The user input interface can comprise any of a number of devices or interfaces allowing the user device 110 to receive data, such as a keypad 318 (hard or soft), a touch display, voice/speech or motion interfaces, or other input devices. In embodiments including a keypad 318, the keypad 318 can include (or cause display of) the conventional numeric (0-9) and related keys (#, *), and other keys used for operating the user device 110 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The user device 110 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the user device 110. As indicated, this may include a user application that is resident on the entity or accessible through a browser or other user interface for communicating with the management computing entity 100 and/or various other computing entities.

In another embodiment, the user device 110 may include one or more components or functionality that are the same or similar to those of the management computing entity 100, as described in greater detail above. As will be recognized, these architectures and descriptions are provided for example purposes only and are not limiting to the various embodiments.

III. Example System Operation

In an embodiment, disclosed herein includes specific distributed access architectures (DAA), wherein aspects of devices capable of Converged Cable Access Platform (CCAP) functionality, remote PHY functionality, remote Medium Access Control (MAC) functionality, and/or remote MAC/PHY functionality, to be further described below, can be placed physically proximate to end users and end user devices, for example, at a cable user's home.

In an embodiment, the systems and devices described herein can describe features of equipment and devices placed in a central office, headend, and/or network hub, or can described features of equipment and devices in the field, for example, in a protective enclosure. The equipment placed in the field may need to have protection against environmental factors, for example, moisture, heat and the like.

In an embodiment, a cable modem termination system CMTS) can include devices that represent the layer-1, layer-2 and/or layer-3 (to be discussed) functionality of the Open Systems Interconnection (OSI) model used in connection with cable networks. In an embodiment, devices that represent the layer-1, layer-2 and/or layer-3 functionality can have a system architecture wherein all the devices are placed in one chassis, that is, in one chassis in one geographical location. In another embodiment, in a remote PHY topology (for example, the topology shown and described in connection with FIG. 4A, to be discussed) and/or the remote PHY MAC (for example, shown and described in connection with FIG. 4B, to be discussed), the layer-1, layer-2 and/or layer-3 devices can exist in a different chassis that may be distributed throughout the network. In one embodiment, the various layer-1, layer-2 and/or layer-3 devices in the distributed architecture described herein can communicate with one another using an Ethernet based protocol. In one embodiment, the various devices (for example, the layer-1, layer-2 and/or layer-3 devices) can communicate using an layer-2 tunneling protocol (L2TP) protocol. In another embodiment, the various devices (that is the layer-1, layer-2 and/or layer-3 devices) can communicate using a downstream external PHY interface (DEPI) protocol, for example, between a layer-2 device to a layer-1 device. In another embodiment, the DEPI protocol can be used between devices that both have MAC functionality. In one embodiment, the various devices can use an upstream external PHY interface (UEPI) protocol to communicate between devices of different layer types, for example, between devices having MAC functionality.

In an embodiment, the systems, methods, and apparatuses described herein can include one or more of devices performing a control plane functionality, a management plane functionality, and a data plane functionality. In an embodiment, the management plane functionality associated with a networking device can refer to configuring, monitoring, and providing management, monitoring and configuration services to, various devices operating at various layers of the network stack and other parts of the system. In an embodiment, the management plan functionality can be distinguished from the control plane functionality, in that the control plane functionality can be directed to implementing routing table and forwarding information activities. In an embodiment, devices described herein that operate on the control plane can refer to devices that determine where data traffic is sent on the network. In an embodiment, such control plane device can implement aspects of the system configuration, management, and exchange of routing table information. In an embodiment, a route controlling functionality associated with the control plane can exchange topology information associated with the system with other router devices on the network, and a routing table can be generated based on a routing protocol. In an embodiment, devices that can send and receive control plane packets can be processed by a device implementing router functionality to update routing table information. In an embodiment, devices described herein that operate on the data plane can refer to devices that can forward data traffic to a next hop along a data path to a given destination network device according to control plane logic. In an embodiment, data plane packets can be processed using devices that implement router and/or switch functionality.

In an embodiment, the different layer devices (for example layer-1, layer-2, and/or layer-3 devices) can communicate using tunneling protocol and/or method, such as, a layer-2 virtual private network (VPN) tunnel, a generic router encapsulation (GRE) and/or a pseudowire. In an embodiment, the pseudowire can refer to an emulation of a point-to-point connection over a network. In an embodiment, the pseudowire can be used to transport frames (for example, DOCSIS frames), over a cable network. In an embodiment, the pseudowire can use a layer two tunneling protocol (L2TP) underlying protocol. In another embodiment, the pseudowire and/or tunnel can use an internet telephony (IP) protocol, such as IPv6 and/or IPv4.

In an embodiment, the DEPI protocol, the UEPI protocol, and/or a generic control plane (GCP) protocol can control aspects of the delivery of Data Over Cable Service Interface Specification (DOCSIS) frames between devices. In an embodiment, DEPI can represent a pseudowire that can connect frames (such as DOCSIS downstream MAC frames) from device from one layer (such as a layer-3 or layer-2 device), to a device from a different layer (for example, a layer-1 device). In an embodiment the devices from the different layers can be provided in separate locations. In an embodiment, the different layer devices can be connected using a common timing source. In an embodiment, the DEPI protocol, the UEPI protocol, and/or the GCP protocol used by the different layer devices (for example layer-1, layer-2, and/or layer-3 devices) can be used to set up a session and tear down a session between the different layer devices.

Fig. 4A shows an example diagram 400 of a system that may be represented by the OSI model in accordance with example embodiments of the disclosure. As shown in FIG. 4A, to be discussed, the physical layer, or layer-1 401 can represent the lowest layer functionality as corresponds to the OSI model. The implementation and/or functionality of this layer can be interchangeably referred to as the physical layer functionality, PHY layer functionality, and/or layer-1 functionality herein. The physical layer 401 can include networking hardware transmission technologies of a network. The physical layer 401 can represent a fundamental layer underlying the logical data structures of higher level functions (for example, the media access control (MAC) layer 403 and the application layer 405, discussed below) in a network. The physical layer 401 can define the means of transmitting raw bits rather than logical data packets over a physical link connecting network nodes. The bit stream may be grouped into code words or symbols and may be converted to a physical signal that is transmitted over a hardware transmission medium. The physical layer 401 may provide an electrical and procedural interface to the transmission medium. The physical layer 401 may include the shapes and properties of the electrical connectors, the frequencies to broadcast on, the modulation scheme to use and similar parameters (for example low-level parameters). In some implementations, the functionality of layer-1 described above may be performed by one or more management computing entity 100 as shown in FIG. 1 and FIG. 2.

FIG. 4A further shows the second layer (also referred to as layer-2 herein) 403, also referred to, interchangeably, as the medium access control or media access control (MAC) layer 403. The MAC layer 403 may provide addressing and/or channel access control mechanisms that can allow several terminals or network nodes to communicate within a multiple access network that incorporates a shared medium, for example an Ethernet, cable, telecommunications, wireless, or other type of network. In an embodiment, the MAC layer 403 can act as an interface and/or intermediary layer between the application layer 405 (discussed below) and the network's physical layer 401. In an embodiment, the MAC layer 403 can emulate a full-duplex logical communication channel in a multi-point network. Multi-point networks can include, but not be limited to, wireless Internet and IP telephony networks, for example, using gigahertz radio frequencies. This channel may provide unicast, multicast or broadcast communication service. Further some functions performed by the MAC layer 403 can include frame delimiting and recognition, addressing of destination network nodes (both as individual nodes and as groups of nodes), conveying of addressing information, protecting against errors, for example by generating and/or checking frame check sequences, and controlling access to the physical transmission medium. The MAC layer 403 (or layer-2 403) can be implemented by numerous devices, including, but not limited to, a cable modem termination system (CMTS), an optical line termination (OLT), or a wireless access point (WAP), and the like. In various embodiments, layer-2 devices 403 (for example the MAC layer devices) can perform mapping operations. For example, the layer-2 devices 403 (for example the MAC layer devices) can associate a service flow identifier to a data group and/or a service group, for example, as a part of a bonding group. In some implementations, the functionality of layer-2 described above may be performed by one or more management computing entity 100 as shown in FIG. 1 and FIG. 2.

FIG. 4A further shows the third layer 405 (also referred to as layer-3 405 herein), which can alternatively be referred to as the application layer 405 herein. The application layer 405 can refer to an abstraction layer that can specify the shared protocols and interface methods used by hosts in a communications network. The application layer 405 (or layer-3 405) abstraction may contain the communications protocols and interface methods used in process-to-process communications across an Internet Protocol (IP) network. The application layer 405 may standardize communication and may depend upon the underlying transport layer protocols to establish host-to-host data transfer channels and manage the data exchange in a client-server or peer-to-peer networking model. In various embodiments, layer-3 405 can provide IP transport routing and/or forwarding for the data being transmitted and received throughout the network. In an embodiment, layer-3 405 can include a internet protocol version 6 (IPv6) and L2VPN forwarding capability. In an embodiment layer-2 virtual private network (L2VPN) functionality can enable cable service providers to use a single, converged, infrastructure to offer an Ethernet data link layer connectivity to devices, for example, devices at two or more customer sites. The functionality of layer-3 405 can be implemented by a device, including, but not limited to, a router. In some implementations, the functionality of layer-3 described above may be performed by one or more management computing entity 100 as shown in FIG. 1 and FIG. 2.

In some examples, the functionality of one or more layers (for example layers 3 and 2 or layers 1, 2 and 3) may be combined. In one embodiment described herein the functionality of the layer-1 401 and the functionality of layer-2 403 may be performed by separate devices, (for example, split MAC/PHY devices). In another embodiment described herein the functionality of the layer-1 401, the functionality of layer-2 403, and the functionality of layer-3 405 may be incorporated into separate devices, to create a fully distributable set of devices. In particular, layer-3 405 functionality can be provided in a separate module/device such that a layer-3 device 405 can transmit packets normally associated with layer-2 403 functionality. Further, layer-2 403 functionality (for example a CMTS and/or an OLT functionality for wireless access point (WAP) functionality) can be provided by a separated module/device. Moreover, layer-1 401 (the PHY layer 401) can be provided by a separated module/device.

In one embodiment, the various devices incorporating different layer functionality (for example layer-1, 2, and 3 devices implementing layer-1, 2, and functionality, respectively) can be separated geographically. For example, a layer-3 device 405 (for example the router) can be placed at a predetermined distance away from a layer-2 device, which can in turn, be placed at a predetermined distance away from a layer-1 device 401. In some examples, the distance may be 1 mile, 10 miles, 100 miles and/or the like. The layer-3 device 405 can, in various embodiments, use a wired or a wireless network (for example, a virtual local access network, VLAN) to serialize and/or send data frames and/or packets to the layer-2 device 403. The layer-2 device 403 can communicate (for example serialize and/or send data frames and/or packets) with the layer-1 device 401. For example, the layer-2 device 403 can use one or more lookup tables, the lookup tables having information including, but not limited to, topology information, bridging information, and/or layer-2 device (for example MAC 2, Cable Modem 2, and/or wireless device) information (for example identification information, bandwidth capability information, location information, and the like). In one embodiment, the layer-2 device 403 can perform global service flow classification and/or basic service flow. The layer-2 device 403 may have source address verification (SAV) policing. In various embodiments, the layer-1 device 401 can perform one or more of the classification routines that can be performed in the MAC layer.

Further, data frames and/or packets from the layer-2 device 403 (MAC layer device) to the layer-1 device 401 (the physical, PHY layer device), can include serialized streams. For example, the serialized streams can be sent downstream from a MAC scheduler to a modulator. In one embodiment, the scheduler may be implemented by one or more computing management entities 100. Alternatively or additionally, for upstream transmission, the serialized streams can be sent, for example, from a demodulator to an upstream MAC layer. In one embodiment, the layer-1 device 401 can receive information (for example, a frequency and/or wavelength for modulation, a modulation protocol, synchronization data, segmentation data specifying a format for transmitting data, and the like) relevant to data transmission and/or reception from the layer-2 device 403. The layer-1 device 401 can modulate the data packets and/or other information (based at least in part on the received information) accordingly, for example, based on the type of network (for example wireless, optical, cable, etc.) on which it is communicating. For example, for wireless networks, the layer-1 device 401 can modulate the data using an RF frequency, for example, with a data over cable service interface specification (DOCSIS) based cable networks, into one or more DOCSIS frame. As another example, for a Gigabit Passive Optical Network (GPON) network, the layer-1 device 401 can modulate the data to GPON Encapsulation Method (GEM) frames. In an embodiment, for an Ethernet Passive Optical Network (EPON) network, the layer-1 device 401 can modulate the data to fixed or variable length EPON frames.

In various embodiments of the disclosure, layer-1, layer-2 and layer-3 functionality can be provided by separate discrete devices, for example, in order to form a distributed MAC/PHY architecture. This can be contrasted with a partial distributed architecture, where one or more layer functionality, for example, layer-2 and layer-3 functionality are provided by a first device while layer-1 functionality is provided by a second device in what may be referred to as a split-MAC architecture.

In various embodiments, the layer-3 device 405 can communicate (for example serialize and/or send and receive data frames and/or packets) with a layer-2 device 403. Further, the layer-2 device 403 may not further determine and/or process information associated with the received information from the layer-3 device 405, and may perform the activities of a switch that switches the IP layer (layer-3) information to MAC layer information. For example, the layer-3 device 405 can send MAC address information to the layer-2 device 403. When a given layer-2 device 403 receives the addressing information from the layer-3 device 405, the layer-2 device 403 can use the addressing information to determine which particular layer-1 device 401 (for example, a given physical layer device such as a cable modem, and a given OLT device, or a given wireless device) to use. The layer-2 device 403 can then instruct a layer-1 device 401 (e.g. a physical layer device) to modulate information on one or more predetermined frequencies and/or wavelengths over a given physical medium. Alternatively, the layer-2 device 403 may further process the information associated with the received information from the layer-3 device 405.

The disclosed systems and methods may not need the functionality of the layers (for example, layers 1, 2, and 3) to be performed by a single integrated device, for example, using processors and memory manipulations configured to execute respective layer (for example, layers-1, 2, and 3) functionality. Further, there may not be any communication protocol for communication between the layers (for example layers 1, 2, and 3). For example, a layer-2 CMTS and/or OLT devices and/or existing wireless networks can operate with the integrated layers (for example layers 1, 2, and 3). With such single integrated devices, many network decisions may be made in a centralized way, which can decrease the throughput and/or the efficiency of the network. Further, the single integrated devices may have various forms of security protection, for example, firewall security protocols, which can have associated network performance limitations.

In some examples having a single integrated device, layer-3 functionality may be performed using a first chip, for example, a layer-3 router chip having a switched Ethernet connection that is electronically connected to a layer-2 implementing a second chip, for example, a MAC chip. The MAC chip may have a serial interface into a layer-3 functionality implementing a third chip, for example, a PHY chip. The MAC chip can generate header information to append to various data packets such that the PHY chip can determine how to process (for example modulate) the data over the physical medium. In an upstream situation, the PHY can receive modulated raw data and can send the data on a serial path from a demodulator to the MAC chip. And then the upstream MAC chip can further process and package the data and transmit it to the router chip implementing layer-3 functionality.

In some examples, layer-2 (for example the MAC layer) functionality may be provided by a separate device in what can be termed a split-MAC architecture, while maintaining the integration of layer-2 and layer-3 functionality in a first device. However, scaling up layer-2 functionality may require the addition of more layer-2 processing chips and associated hardware, which may lead to adding a bigger chassis in the integrated device of which it is part, thereby increasing costs.

FIG. 4B shows an example diagram 401 of a system that may be represented by the OSI model, in accordance with example embodiments of the disclosure. As shown in FIG. 4B, the physical layer, or layer-1 401 can represent the lowest layer. The implementation and/or functionality of this layer can be interchangeably referred to as the physical layer functionality, PHY layer functionality, and/or layer-1 functionality herein. The physical layer 401 can include networking hardware transmission technologies of a network. The physical layer 401 can represent a fundamental layer underlying the logical data structures of higher level functions (for example the media access control (MAC) layer 403 and the application layer 405, discussed below) in a network. The physical layer 401 can define the means of transmitting raw bits rather than logical data packets over a physical link connecting network nodes. The bit stream may be grouped into code words or symbols and may be converted to a physical signal that is transmitted over a hardware transmission medium. The physical layer 401 may provide an electrical and procedural interface to the transmission medium. The physical layer 401 may include the shapes and properties of the electrical connectors, the frequencies to broadcast on, the modulation scheme to use and similar parameters (for example low-level parameters). In some implementations, the functionality of layer-1 described above may be performed by one or more management computing entity 100 as shown in FIG. 1 and FIG. 2.

FIG. 4B further shows the second layers (also referred to as layer-2 herein) 403*a* and 403*b*, also referred to, interchangeably, as the split medium access control or media access control (MAC) layer, which can include an upper MAC layer 403*a* and a lower MAC layer 403*b*, which may be implemented using two separate devices, one for the upper MAC layer 403*a* and another for the lower MAC layer 403*b*. In an embodiment, the devices representing the upper MAC layer 403*a* and another for the lower MAC layer 403*b* can be physically separated and placed at a predetermined distance from one another and/or other devices in the network.

In an embodiment, the split-MAC layer comprising the upper MAC layer 403*a* and the lower MAC layer 403*b* may provide addressing and/or channel access control mechanisms that can allow several terminals or network nodes to communicate within a multiple access network that incorporates a shared medium, for example an Ethernet, cable, telecommunications, wireless, or other type of network. The split-MAC layer 403*a* and 403*b* can act as an interface and/or intermediary layer between the application layer 405 (discussed below) and the network's physical layer 401. The split-MAC layer 403*a* and 403*b* can emulate a full-duplex logical communication channel in a multi-point network. Further some functions performed by the split-MAC layer 403*a* and 403*b* can include frame delimiting and recognition, addressing of destination network nodes (both as individual nodes and as groups of nodes), conveying of addressing information, protecting against errors, for example by generating and/or checking frame check sequences, and controlling access to the physical transmission medium.

In an embodiment, the split-MAC layer 403*a* and 403*b* (or layer-2 403*a* and 403*b*) can be implemented by numerous devices, including, but not limited to, a cable modem termination system (CMTS), an optical line termination (OLT), or a wireless access point (WAP), and the like. In various embodiments, layer-2 devices 403*a* and/or 403*b* (for example the MAC layer devices) can perform mapping operations. For example, the layer-2 devices 403*b* (for example the lower MAC layer devices) can associate a service flow identifier to a data group and/or a service group, for example, as a part of a bonding group. In some implementations, the functionality of layer-2 described above may be performed by one or more management computing entity 100 as shown in FIG. 1 and FIG. 2.

FIG. 4B further shows the third layer 405 (also referred to as layer-3 405 herein), which can alternatively be referred to as the application layer 405 herein. The application layer 405 can refer to an abstraction layer that can specify the shared protocols and interface methods used by hosts in a communications network. The application layer 405 (or layer-3 405) abstraction may contain the communications protocols and interface methods used in process-to-process communications across an IP network. The application layer 405 may standardize communication and may depend upon the underlying transport layer protocols to establish host-to-host data transfer channels and manage the data exchange in a client-server or peer-to-peer networking model. In various embodiments, layer-3 405 can provide IP transport routing and/or forwarding for the data being transmitted and received throughout the network. In an embodiment, layer-3 405 can include a IPv6 and L2VPN forwarding capability. In an embodiment Layer 2 Virtual Private Network (L2VPN) feature can enable service providers to use a single, converged network infrastructure to offer Ethernet data link layer connectivity to two or more customer sites. The functionality of layer-3 405 can be implemented by a device, including, but not limited to, a router. In some implementations, the functionality of layer-3 described above may be performed by one or more management computing entity 100 as shown in FIG. 1 and FIG. 2.

In some examples, the functionality of one or more layers (for example layers 3 and 2 or layers 1, 2 and 3) may be combined. In one embodiment described herein the functionality of the layer-1 401 and the upper MAC layer 403*a* and the lower MAC layer 403*b* functionality may be performed by separate devices (for example split MAC/PHY devices). In another embodiment described herein the functionality of the layer-1 401, the functionality of layers-2 403*a* and 403*b*, and the functionality of layer-3 405 may be incorporated into separate devices, to create a fully distributable set of devices. In particular, layer-3 405 functionality can be provided in a separate module/device such that a layer-3 device 405 can transmit packets normally associated with layer-2 403 functionality. Further, layers-2 403*a* and 403*b* functionality (for example a CMTS and/or an OLT functionality for wireless access point (WAP) functionality) can be provided by a separated module/devices, such as one device for the upper MAC 403*a* functionality and another for the lower MAC functionality. Moreover, layer-1 401 (the PHY layer 401) can be provided by a separated module/device.

In one embodiment, the various devices incorporating different layer functionality (for example layer-1, 2, and 3 devices implementing layer-1, 2, and functionality, respectively) can be separated geographically. For example, a layer-3 device 405 (for example the router) can be placed a predetermined distance away from a layer-2 device, which can in turn, be placed a predetermined distance away from a layer-1 device 401. In some examples, the distance may be 1 mile, 10 miles, a 100 miles and/or the like. The layer-3 device 405 can, in various embodiments, use a wired or a wireless network (for example a virtual LAN, VLAN) to serialize and/or send data frames and/or packets to the layer-2 device 403. The layer-2 device 403 can communicate (for example serialize and/or send data frames and/or packets) with the layer-1 device 401. For example, the layer-2 devices representing the split-MAC layer 403*a* and 403*b* can use one or more lookup tables, the lookup tables having information including, but not limited to, topology information, bridging information, and/or layer-2 device (for example MAC 2, Cable Modem 2, and/or wireless device) information (for example identification information, bandwidth capability information, location information, and the like). In one embodiment, the layer-2 devices representing the split-MAC layer 403*a* and 403*b* functionality can perform global service flow classification and/or basic service flow. The layer-2 devices representing the split-MAC layer 403*a* and 403*b* functionality may have source address verification (SAV) policing. In various embodiments, the layer-1 device 401 can perform one or more of the classification routines that can be performed in the MAC layer.

Further, data frames and/or packets from the layer-2 devices representing the split-MAC layer 403*a* and 403*b* functionality to the layer-1 device 401 (the physical, PHY layer device), can include serialized streams. For example, the serialized streams can be sent downstream from a MAC scheduler to a modulator. In one embodiment, the scheduler may be implemented by one or more computing management entities 100. Alternatively or additionally, for upstream transmission, the serialized streams can be sent, for example, from a demodulator to an upstream MAC layer. In one embodiment, the layer-1 device 401 can receive information (for example, a frequency and/or wavelength for modulation, a modulation protocol, synchronization data, segmentation data specifying a format for transmitting data, and the like) relevant to data transmission and/or reception from the layer-2 devices representing the split-MAC layer 403*a* and 403*b* functionality. The layer-1 device 401 can modulate the data packets and/or other information (based at least in part on the received information) accordingly, for example, based on the type of network (for example wireless, optical, cable, etc.) on which it is communicating. For example, for wireless networks, the layer-1 device 401 can modulate the data using an RF frequency, for example, with a DOCSIS based cable networks, into one or more DOCSIS frame. As another example, for a Gigabit Passive Optical Network (GPON) network, the layer-1 device 401 can modulate the data to GPON Encapsulation Method (GEM) frames.

In various embodiments of the disclosure, layer-1, layer-2 and layer-3 functionality can be provided by separate discrete devices, for example, in order to form a distributed MAC/PHY architecture. This can be contrasted with a partial distributed architecture, where one or more layer functionality, for example, layer-2 and layer-3 functionality are provided by a first device while layer-1 functionality is provided by a second device in what may be referred to as a split-MAC architecture.

In various embodiments, the layer-3 device 405 can communicate (for example serialize and/or send and receive data frames and/or packets) with layer-2 devices representing the split-MAC layer 403*a* and 403*b* functionality. Further, the layer-2 devices representing the split-MAC layer 403*a* and 403*b* functionality may not further determine and/or process information associated with the received information from the layer-3 device 405, and may perform the activities of a switch that switches the IP layer (layer-3) information to MAC layer information. For example, the layer-3 device 405 can send MAC address information to the layer-2 device 403. When a given layer-2 devices representing the split-MAC layer 403*a* and 403*b* functionality receives the addressing information from the layer-3 device 405, the layer-2 device 403 can use the addressing information to determine which particular layer-1 device 401 (for example, a given physical layer device such as a cable modem, and a given OLT device, or a given wireless device) to use. The layer-2 devices representing the split-MAC layer 403*a* and 403*b* functionality can then instruct a layer-1 device 401 (e.g. a physical layer device) to modulate information on one or more predetermined frequencies and/or wavelengths over a given physical medium. Alternatively, the layer-2 devices representing the split-MAC layer 403*a* and 403*b* functionality may further process the information associated with the received information from the layer-3 device 405.

Further, the single integrated devices may have various forms of security protection, for example, firewall security protocols, which can have associated network performance limitations. In some examples having a single integrated device, layer-3 functionality may be performed using a first chip, for example, a layer-3 router chip having a switched Ethernet connection that is electronically connected to a layer-2 implementing a second chip, for example, a MAC chip. The MAC chip may have a serial interface into a layer-3 functionality implementing a third chip, for example, a PHY chip. The MAC chip can generate header information to append to various data packets such that the PHY chip can determine how to process (for example modulate) the data over the physical medium. In an upstream situation, the PHY can receive modulated raw data and can send the data on a serial path from a demodulator to the MAC chip. And then the upstream MAC chip can further process and package the data and transmit it to the router chip implementing layer-3 functionality.

In some examples, layer-2 devices representing the split-MAC layer 403*a* and 403*b* functionality may be provided by separate devices in what can be termed a split-MAC architecture, while maintaining the integration of layer-1 and layer-3 functionality in a first device.

In one embodiment as shown in FIG. 4A and FIG. 4B, the routing configuration, the Layer-2 Virtual Private Networks (L2VPN) configuration, the Dynamic Host Configuration Protocol (DHCP) relay and/or the DOCSIS management functionality can use a generic control plane protocol (GCTP) for control plane functionality. In an embodiment, the DHCP relay agent can refer to functionality to forward DHCP packets between clients and servers. In one embodiment, having various layer-1, layer-2 and/or layer-3 devices present in geographically distinct areas can present a timing and/or synchronization problem. For example, if all devices, that is, all layer-1, layer-2 and/or layer-3 devices are within a an approximately 20 kilometer distance of one another, there may not be much drift between clocks and the components that is the different layer devices may be able to stay in synchronization. In another embodiment, if the devices are spread geographically far enough apart there may be delays, for example delays on the order of approximately 200 microseconds, which can lead to many synchronization problems in the network causing undesirable collisions and the like.

In one embodiment, as shown in FIG. 4B, a layer-2 403*a* device can include an upper MAC functionality and can include functionality related to various control decisions. For example, the upper MAC functionality represented in the layer-2 device 403*a* can include a MAC to cable model (CM) and multi-cast table functionality, a classifier to Service Flow Identifier (SFID) functionality and/or an SFID QoS parameter functionality. In an embodiment, the SFID and/or SFID QoS parameter can be used in provided quality of service through the network. In another embodiment, the upper MAC layer-2 device 403*a* can include data processing functionality such as a multicast and duplication functionality, a Group Service Flows (GSF) classification and/or an service flow (SF) classification functionality, a bridging functionality, a policing and source address verification (SAV) functionality, an layer-2 (L2) QoS functionality and/or or an upstream (US) classification functionality. In one embodiment, the upper MAC layer-2 device 403*a* can include a data function functionality including, for example, a sub topology functionality, a DOC SIS policing and QoS 412 functionality. In one embodiment, the upper MAC layer-2 device 403*a* can include a control functionality including, for example, a DHCP relay functionality and/or a DOCSIS management 410 functionality.

In one embodiment, a lower MAC layer-2 device 403*b* can include a table and mapping functionality, for example, an SFID to bonding group (BG) conversion functionality and/or a header, baseline privacy interface plus (BPI+) and payload header suppression (PHS) functionality. In another embodiment, the lower MAC layer-2 device 403b can include a data processing functionality, including, for example, a downstream (DS) bonding or a upstream (US) bonding functionality, and a DS MAC or a US MAC functionality. In one embodiment, the lower MAC layer-2 device 403b can include a data functionality, including, for example, a bonding functionality and/or a DOCSIS MAC functionality. In one embodiment, the lower MAC layer-2 device 403b can include a DOCSIS management 410 functionality representing a control functionality on the network.

In one embodiment, the upper level MAC device 403a can make various network decision and/or create various tables, mapping protocols and/or network addresses to one another. In another embodiment, the lower level MAC device 403b can include high priority scheduling and/or processes. In one embodiment, the higher level MAC and/or the lower level MAC can use protocols such as Address Resolution Protocol (ARP) and/or Gratuitous Address Resolution Protocol (GARP). In one embodiment, the ARP can be broadcast throughout the network. In another embodiment, these protocols can be used to determine the various devices on the network and their locations and identities. In one embodiment, the upper MAC level layer-2 device can be virtualized in the cloud. In another embodiment, the lower level MAC device may not be virtualized but rather may exist in a discreet device.

FIG. 5A shows a diagram 500 of example network architectures 501, 503, and 505 in accordance with example embodiments of the disclosure. As shown in 501, 503, and 505 of FIG. 5A, layer-3 devices 505 can communicate with layer-2 devices 507, which can in turn communicate with layer-1 devices 509.

As shown in 501, one approach can have a single layer-3 device 505 communicating with one or more integrated layer-2 507 and layer-1 509 devices. Because, in some examples, the layer-2 and layer-1 functionality is integrated in one device, if there is a need for additional layer-1 (or layer-2) functionality, and additional integrated layer-1 and layer-2 device may be added to the network to support more users. This can add additional costs and inconveniences, because of the additional complexity of the devices having both layer (1 and 2) functionality, when only layer-1 (or layer-2) functionality was needed.

As shown in 503, one layer-2 device 508 in the multiple layer-2 devices 507 can communicate with multiple layer-1 devices 509. In this way, if there is a need in the network for more physical layers (for example layer-1) processing, more layer-1 devices 509 can be added, without being forced to add more layer-2 devices 507. Further, if more MAC layer (for example layer-2) processing is needed, more layer-2 devices 507 can be added, independently. In this way, an added degree of flexibility is provided to the network architecture of 503 as compared with the network architecture of 501. Further, one or more backup layer-2 and/or layer-1 devices can be used, for example, in accordance with Ethernet Ring Protection Switching (ERPS) under G.8032 Recommendation version 2 standards or other similar standards to provide redundancy in the network.

As shown in 505, a given layer-3 device 505 can communicate with multiple layer-2 devices 507. Further multiple layer-2 devices 507 can communicate with multiple layer-1 devices 509, and a given layer-2 device 507 can have at least partially communicate with a different layer-2 device's 507 associated layer-1 device(s) 509. In this way, 505 depicts a more configurable network, where each device (layer-1, layer-2, and layer-3) can at least partially communicate with every other device in a predetermined range.

In various embodiments, by adding additional layer-1 device(s) 509 that have separate layer-1 (for example physical layer) functionality (for example, by way of more modulators), a single hardware element may be added, for example, a single chip. Thereby layer-1 device(s) 509 can be scaled independently from layer-2 devices 507. Further, one layer-1 device 509 can be used to service many or multiple layer-1 devices 509. For example, if more physical layer processing is needed and/or more MAC processing is needed for a particular network, one or more layer-2 devices 507 and/or layer-1 devices 509 (for example, chips configured for MAC and/or PHY layer functionality) can be added to the network.

Further, in various embodiments, not only can the layer-1, layer-2, and/or layer-3 devices be scaled independently, but they may be placed in separate physical locations. For example, in wireless network implementations, layer-3 devices 509 (for example routers for wireless networks) may be placed in a central data center. Further, the layer-2 devices 507 (for example the MAC layer devices) can be placed geographically closer to one or more customers. For example, in cable network implementations, the layer-2 devices 507 (for example the MAC layer devices) can be placed in one or more headends, and/or one or more hub sites. Further, the layer-1 devices 509 (for example the physical layer devices) can be geographically placed at a plant and/or at a customer premise. For example, the layer-1 devices 509 (for example the physical layer devices) can be geographically placed on every floor of a multi-story building. In each case, the layer-2 devices 507 (for example the MAC layer devices) can determine the locations of those customers for a given data stream.

In various embodiments, because the geographical placement of the layer-1, layer-2, and/or layer-3 devices can span relatively large distances, there may be additional timing and synchronization considerations (for example on the order of picoseconds) on the transmission and reception of information on the network by one or more of the devices. For example, for upstream communications (from layer-1 devices 509 to layer-2 devices 507), the layer-2 device 507 can send timing information to the demodulator of one or more layer-1 devices 509 in one or more timing windows. This can be because the demodulator of the layer-1 device 509 may already be receiving transmissions from one or more user devices (not shown). Therefore, the layer-1 device 509 may need to send the received timing information down to the user devices so that the customers know when to transmit data upstream on the network. Otherwise, the received data from the one or more user devices may need to be treated using collision detection algorithms, for example, carrier sense multiple access with collision detection (CSMA/CD) algorithms. For example, in Ethernet, the customers' user devices may try to transmit and then randomly back-off and retry. The user devices may retry repeatedly until there are no remaining collisions. In some implementations, the upstream transmissions can be scheduled to reduce the need for back-off and retries (for example, using a Dynamic Host Configuration Protocol (DHCP) for DOCSIS-based cable networks, passive optical networks (PONs), and wireless networks).

Returning to FIG. 4A and/or FIG. 4B, the disclosed systems and methods can provide an efficient upstream data transmission on the network for example, by synchronizing the data transmission and reception layer-2 devices 403 (or layer-2 devices 403a and 403b, for example the MAC and/or split MAC layer devices) and layer-1 devices 401 (for example the physical layer devices), for example, by communicating timing information between devices (discussed further below). This can be performed, for example, using a DOCSIS management module 410 and/or 411 for cable networks, or similar management modules (not shown) for example, for PONs.

In one embodiment, the timing information can include the specification of a transmission/reception window for data transmission/reception. The transmission/reception window can include a given period of time that can be designated for example, by sub-blocks of time T0 to sub-block TN, each sub-block having a predetermined duration. In a given block of time, for example, T0-T9, a given later time sub-block that is not part of the block, for example, T12, may represent a contention region where layer-1 devices 401 can request from a layer-2 device 403 or layer-2 devices 403a and 403b permission to transmit data. The request can be communicated to the scheduler of the layer-2 device 403 or the layer-2 devices 403a and 403b. In one embodiment, the scheduler may be implemented by one or more computing management entities 100. The request can further be processed in conjunction with policing quality 412 of the service topology associated with the network, and/or other layer-2 device 403 or layer-2 devices 403a and 403b functions as shown in FIG. 4A and/or FIG. 4B). If permission is granted by the layer-2 device 403 or the layer-2 devices 403a and 403b, the scheduler can schedule the transmission of the data from the layer-1 device 401 to the layer-2 device 403 or the layer-2 devices 403a and 403b. Further, the scheduler (or another module of the layer-2 device 403 or the layer-2 devices 403a and 403b) can communicate that to the layer-1 device 401, for example, in time blocks T3-T4 and reserve blocks T5-T9 for upstream transmission by the layer-1 device 401 to the layer-2 device 403 or the layer-2 devices 403a and 403b.

The timing of the upstream and/or downstream data transmission between layer-2 device 403 or the layer-2 devices 403a and 403b and layer-1 devices 401 can, in various embodiments, be performed using IEEE 1588 timing standard and/or other communications standard and/or protocol, for example, Spanning Tree Protocol (STP), Dynamic Trunking Protocol (DTP), and/or DOCSIS timing protocols, and the like. In various embodiments, the distances between layer-2 devices 403 or the layer-2 devices 403a and 403b and layer-1 devices 401 may be approximately ten, hundreds, or thousands of miles.

In various embodiments, downstream transmission (for example from a layer-2 device 403 or the layer-2 devices 403a and 403b to a layer-1 device 401) can include a broadcast transmission including timing information. In various embodiments, the layer-1, 2, and/or 3 devices can use one or more oscillator chips for the determination and/or transmission of timing information. For example, a oscillator chip of a given layer-1, 2, and/or 3 device can raise or drop the magnitude or phase of a signal to indicate the timing information, which can be detected by one or more different layer-1, layer-2, and/or layer-3 devices.

In some examples, a single devices incorporating the functionality of layer-1, layer -2 and layer-3 may need to be placed close to the customer, for example, in a central office. In different examples, the layer-3 functionality may be performed a separate layer-3 device 405 (for example using a router implementing various routing functions). Similarly, a Digital Subscriber Line Access Multiplexer (DSLAM), may be placed out in the field, which may include the layer-2 and/or layer-1 functionality.

One advantage of separating out the layer functionality in different devices can be that the distributed architecture can result in a reduced need to cool the surface of the devices. For example, an integrated single devices may need to be cooled in a controlled environment. For the distributed architecture described herein, dissipating the heat for the layer-3 device 405 and/or the layer-2 devices 403 or the layer-2 devices 403a and 403b and/or the layer-1 device 401 can be performed using heat sinks and/or thermal fin cooling methods and devices. The devices 405, 403, 403a, 403b, and 401 being placed geographically apart from one another may, for example, reduce the heat buildup around the devices 405, 403 and/or 401.

In one embodiment FIG. 5B represents a diagram 511 that shows the signaling between different layer devices (for example layer-1, layer-2 and/or layer-3 devices), in accordance with one or more example embodiments of the disclosure. In one embodiment, the headend device (also referred to as an HE device herein) 502 may be represented by a layer-3 device. In another embodiment, the remote PHY device (also referred to as an RPD device herein) 504 may be represented by a layer-2 device. In one embodiment, the cable modem device (also referred to as an CM device herein) 506 may be represented by a layer-1 device. In one embodiment, the topology and the device layer demarcations of the diagram 511 may be represented by the diagram of FIG. 4A.

In one embodiment, diagram 511 can represent a signaling diagram for communication between different layer devices where one of the devices represents a remote PHY device. In one embodiment, the signaling diagram 511 can represent the use of a remote PHY device in association with a DOCSIS protocol. In one embodiment, MAC scheduling can be handled at a headend device 502, which can be a layer-3 device (see, for example, FIG. 4A and related discussion). In one embodiment, the distance between the headend device 502 and the remote PHY device 504 can be greater than approximately 1000 km. In one embodiment, the distance between the headend device 502 and the remote PHY device 504 can lead to various delays associated with the transmission of information over the network, for example, delays on the order of approximately 5 milliseconds to approximately 10 milliseconds. In one embodiment, for gaming applications, the maximum delay that may be allowable may be less than or equal to approximately 1 millisecond to approximately 20 milliseconds. In another embodiment, for applications involving virtual reality, the associated delays may need to be less than or equal to 15 milliseconds. In one embodiment, for applications involving augmented reality, the delay may need to be less than or equal to 7 milliseconds. In one embodiment, for applications associated with 5G implementations, the maximum delay may need to less than or equal to approximately 1 millisecond to approximately 5 milliseconds.

In one embodiment, the cable modem 506 can transmit a generated packet 508 to the remote PHY device 504. In one embodiment, the generated packet 508 may include one or more sub-packets 510. In one embodiment, there can be a propagation delay $\sigma_1$ (also referred to herein as sigma-1) 512 associated with the transmission of the generated packet 508 to the remote PHY device 504. In one embodiment, the remote PHY device 504 can transmit a request packet 514 to the headend device 502. In another embodiment, the headend device 502 can thereby route and/or perform any layer-3 functions on the requested packet 514. In one embodiment, there may be a network propagation delay $\tau_1$ (also referred to herein as tau-1) 516 associated with the transmission of the request packet 514 to the headend device 502. In one embodiment, the headend device 502 can transmit a grant packet 518 to the remote PHY device 504. In an embodiment, the grant packet 518 may include any type of routing information and/or permissions associated with the grant packet and/or provided by the headend device 502. In one embodiment, the grant packet 518 may have an associated network propagation delay $\tau_2$ (also referred to herein as tau-2) 520. In one embodiment, the remote PHY device 504 may take the grant packet 518 and modify it further (not shown). In one embodiment, the modified grant packet 518 may comprise an updated grant packet 522, which can be routed to one or more cable modems 506 using a modified grant packet 522. In one embodiment, the transmission of the modified grant packet 522 may have an associated propagation delay $\sigma_2$ (also referred to herein as sigma-2) 524. After a period of time, the cable modem 506 can then take the results from the updated grant packet 522 and repackage it into data 524 for transmission to the remote PHY device 504. In one embodiment, there may be a propagation delay $\sigma_3$ (also referred to herein as sigma-3) 526 associated with the data packet 524. In one example embodiment, the remote PHY device 504 can take the received transmitted data packet 524 and transmit the data to the headend device 502 using a second data packet 528. In one embodiment, the second data packet 528 can be used in transmission over the internet. In one embodiment, there may be an associated network propagation delay $\tau_3$ (also referred to herein as tau-3) 530 associated with the transmission of the second data packet 528 from the remote PHY device 504 to the headend device 502.

FIG. 5C shows an example diagram 513 of scheduling between the different layer devices (for example, layer-1, layer-2 and/or layer-3 devices), in accordance with one or more example embodiments of the disclosure. In one embodiment, the headend device (also referred to as an HE device herein) 532 can be represented by a layer-3 device. In another embodiment, the remote MAC device (also referred to as an RMD device herein) 534 can be represented by a layer-2 device. In one embodiment, the cable modem device (also referred to as an CM device herein) 536 can be represented by a layer-1 device. In one example embodiment, the network topology of the headend device 532, the remote MAC device 534 and the cable modem device 536 can be represented by FIG. 4B and related discussion.

In one embodiment, the cable modem device 536 can generate a packet 540 to be transmitted to the remote MAC device 534. In another embodiment, the generated packet 540 can include a sub-packet 542. In one embodiment, the transmission of the generated packet 540 from the cable modem device 536 to the remote MAC device 534 can include an associated propagation delay sigma-1 544. In one embodiment, the remote MAC device 534 can process the received packet 540 from the cable modem device 536. In another embodiment, there may be an associated delay $\alpha$ 546 with the processing of the received packet 540 by the remote MAC device 534. In one embodiment, the associated delay $\alpha$ 546 can be approximately 1 millisecond to approximately 2 milliseconds. In one embodiment, the remote MAC device 534 can transmit a grant packet 548 to the cable modem device 536. In another embodiment, the grant packet 548 can include various information such as header information that includes routing information and the like that is appended by the remote MAC device 534 to the grant packet 548. In one embodiment, the grant packet 548 may have an associated delay sigma-2 550 associated with the transmission of the grant packet 548 from the remote MAC device 534 to the cable modem 536. In one embodiment, the cable modem device 536 can then transmit a modified version of the grant packet, a second packet 550 from the cable modem device 536 to the remote MAC device 534. In one embodiment, the transmission of the second packet 550 from the cable modem device 536 to the remote MAC device 534 may have an associated propagation delay sigma-3 552. In one embodiment, the remote MAC device 534 may then transmit data packet 554 associated with a modified version of the second packet 552 from the remote MAC device 534 to the headend device 532, for example, for transmission over the internet. In one embodiment, the transmission of the data packet 554 from the remote MAC device 534 to the headend device 532 may have an associated network propagation delay tau-1 556. In an embodiment, the various delays sigma-1, sigma-2, sigma-3, and/or tau-1 may be similar, but not necessarily identical to, the delays shown and described in connection with FIG. 5B.

In one embodiment, the remote MAC device 534 and the headend device 532 may be located geographically as far apart, for example, on the order of thousands of kilometers. In another embodiment, the remote MAC device 534 may include a scheduler functionality as shown and described further in connection with FIG. 4B and associated discussion. In one embodiment, the remote MAC device 534 may serve approximately 32 to 100 customers in the cable network. In one example embodiment, the topology associated with the scheduling diagram 513 (that is the topology of the remote MAC device 534 as further shown and described in connection with FIG. 4B) may have fewer associated delays than that of the corresponding network topology shown in FIG. 5B. In an embodiment, the reduction of the delays in diagram 513 may be at least partially due to the remote MAC device 534 carrying on aspects of the functionality of the headend device 532 (as compared with the headend device 502 of FIG. 5B).

Figure 6A:
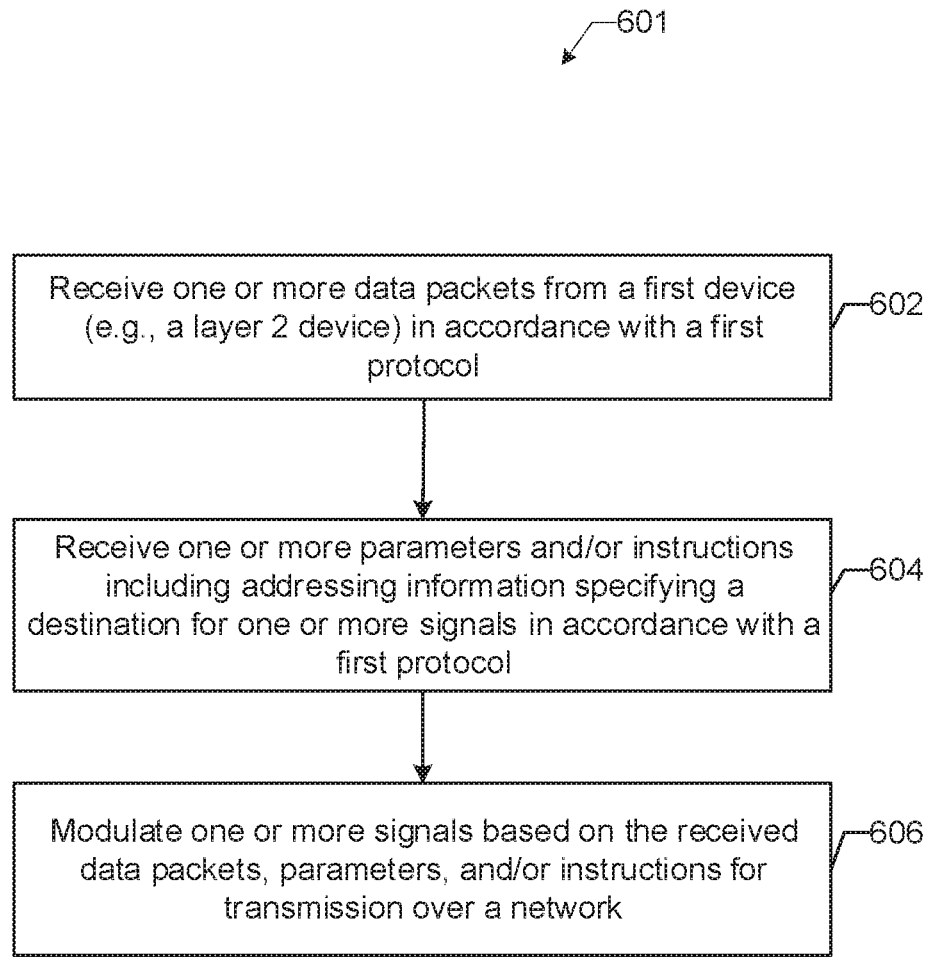
Figure 6B:
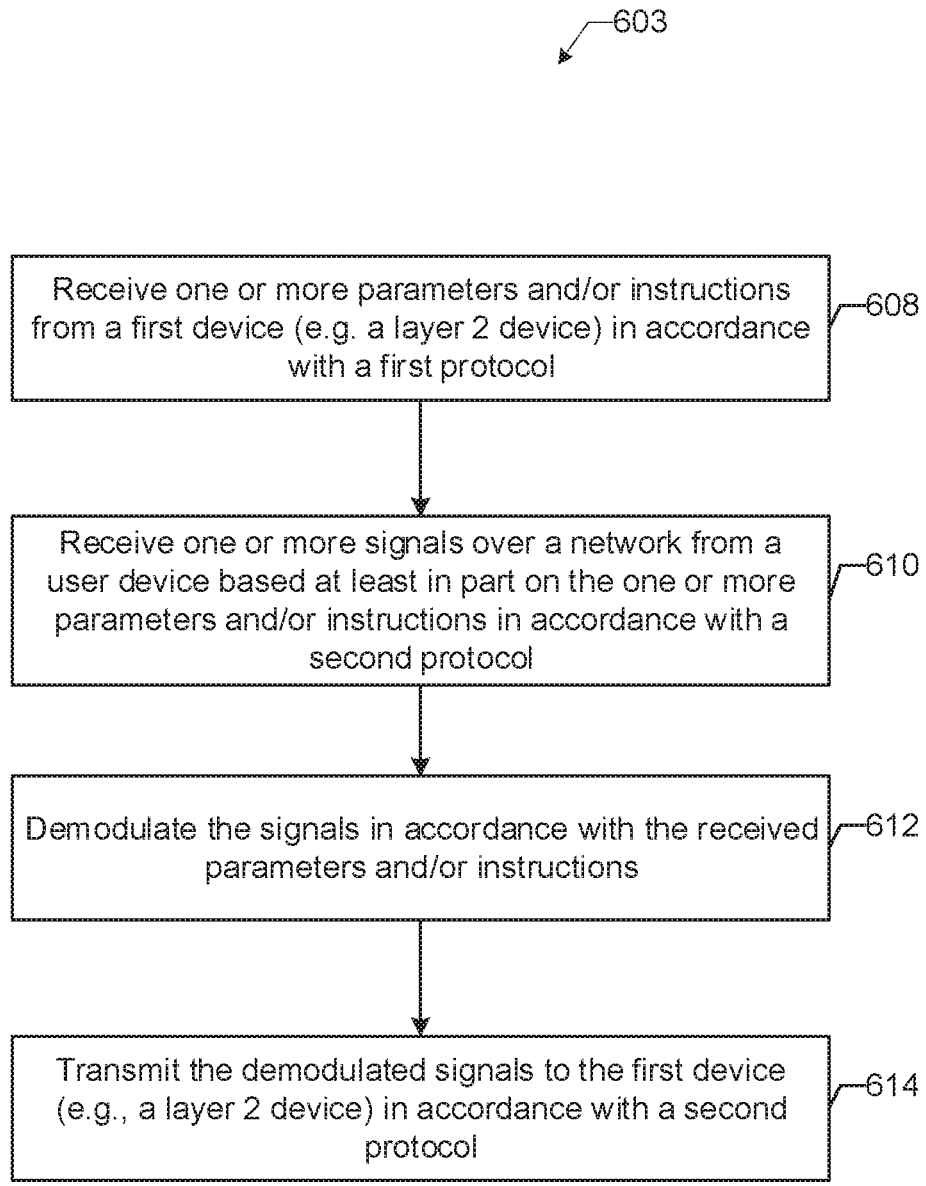

FIGS. 6A-6B shows example diagrams 601 and 603 of an example layer-1 device functionality, in accordance with example embodiments of the disclosure.

As shown in FIG. 6A, the process 601 illustrates an example downstream functionality of the layer-1 device. The process 601 may begin with block 602 where the layer-1 device can receive one or more data packets from a first device (for example a layer-2 device) in accordance with a first protocol (for example, a downstream protocol such as DEPI). The process 601 may then continue to block 604, where the layer-1 device can receive one or more parameters and/or instructions including addressing information specifying a destination for one or more signals, in accordance with a first protocol (for example, a downstream protocol such DEPI). The process 601 may then end with block 606, the layer-1 device can modulate one or more signals based on the received data packets, parameters, and/or instructions for transmission over a network.

As shown in FIG. 6B example process 603 illustrates the upstream functionality of the layer-1 device. In block 608, the layer-1 device can receive one or more parameters and/or instructions from a first device (layer-2), in accordance with a first protocol (for example, a downstream protocol such DEPI). The process 603 may then continue with block 610, where the layer-1 device can receive one or more signals over a network from a user device based at least in part on the one or more parameters and/or instructions, in accordance with a second protocol (for example, an upstream protocol such UEPI). In block 612, the layer-1 device can demodulate the signals in accordance with the received parameters and/or instructions. Finally, the process 603 may end with block 614, where the layer-1 device can transmit the demodulated signals to the first device (layer-2), in accordance with a second protocol (for example, an upstream protocol such UEPI).

FIGS. 7A-7B shows diagrams 701 and 703 of an example layer-2 device functionality, in accordance with example embodiments of the disclosure.

FIG. 7A illustrates and example process 701 describing the downstream functionality of the layer-2 device. The process 701 may begin with block 702, where the layer-2 device can receive one or more data frames and/or packets from a first device (for example a layer-3 device), in accordance with a first protocol (for example, a downstream protocol such DEPI). The process 701 may continue with block 704, where the layer-2 device can process the data frames and/or packets in order to: classify the data frames and/or packets into corresponding service flows (for example, using service flow IDs (SFIDs)), encapsulate data frames and/or packets (for example, into DOCSIS frames), determine routing information associated with the data frames and/or packets, determine resource allocation, scheduling, service flow, quality of service (QoS) on the data frames and/or packets. Finally, the process 701 may end with block 706, where the layer-2 device can transmit the processed data frames to a second device (for example a layer-1 device), for example, in one or more serialized streams, in accordance with a first protocol (for example, a downstream protocol such DEPI).

FIG. 7B illustrates an example process 703 describing the upstream functionality of the layer-2 device. The process 703 may begin with block 708, where the layer-2 device can receive one or more demodulated signals from a first device (for example a layer-1 device), in accordance with a second protocol (for example, an upstream protocol such UEPI). The process 701 may continue with block 710, where the layer-2 device can classify demodulated signals into higher layer packet flows and/or reassemble upstream fragmented demodulated signals. Finally, the process 703 may end with block 712, where the layer-2 device can transmit the classified and/or reassembled demodulated signals to a second device (for example a layer-3 device), in accordance with a second protocol (for example, an upstream protocol such UEPI).

FIGS. 8A-8B shows diagrams 801 and 803 of an example layer-3 device functionality, in accordance with example embodiments of the disclosure.

FIG. 8A illustrates an example process 801 describing the upstream functionality of the layer-3 device. The process 801 may begin with block 802, where the layer-3 device can receive classified and/or reassembled demodulated signals from first devices (for example a layer-2 device), in accordance with a second protocol (for example, an upstream protocol such UEPI). The process 801 may then continue to block 804, where the layer-3 device can control and monitor routing functions associated with the first devices (for example a layer-2 device) and other devices (for example a layer-1, 2, or 3 device) associated with the network.

FIG. 8B illustrates an example process 803 describing the downstream functionality of the layer-3 device. The process 803 may begin with block 806, where the layer-3 device can determine content to provide to one or more devices, the content including, for example, video or audio data. The process 803 may then continue with block 808, where the layer-3 device can determine one or more parameters including segmentation data specifying a format for transmitting data, timing data, and addressing information specifying receiving devices (for example a layer-2 device and/or a layer-1 device). In block 810, the layer-3 device can provide content to first devices (for example a layer-2 device), in accordance with a first protocol (for example, a downstream protocol such DEPI). Finally, the process 803 may end with block 812, where the layer-3 device can provide, control and monitor transport routing and/or forwarding functions for data being transmitted and received throughout the network to the first devices (for example a layer-2 device) based at least in part on the determined parameters.

FIG. 9 shows a diagram of an example environment in which the disclosed systems and methods can be implemented in accordance with example embodiments of the disclosure. FIG. 9 shows that multiple devices (for example, a layer-1 device 901, layer-2 device 903, and layer-3 device 905) each may be a management computing entity similar the management computing entity 100 of FIG. 1 and/or computing entity 200 of FIG. 2. The devices maybe in communication with one another. Further, while only three devices are shown, it can be understood that many more devices can be connected in such a configuration, in accordance with example embodiments disclosed herein. In one embodiment, one or more layer-3 devices 905 can be placed in a first location, for example, at a Regional Data Center (RDC), or alternatively a location of a Central Office (CO) (for example, for Telecom networks), and/or a Main Transmission Center (MTC) (for example, for cable networks). In one embodiment, there may be only one RDC for a geographic region. For example, there may be one RDC that covers the southwestern US, another that covers the northwestern US, another that covers the northwestern US, and another that covers the southeastern US. Further, local markets can be accessed with Sub Transmission Centers (STCs).

As mentioned, one or more layer-1 devices 901 can be placed geographically disparate environments, which can be connected to other layer-1 901 and/or layer-2 devices 903 using, for example, a fiber link. In one embodiment, the fiber link can extend, for example, approximately 100 miles or more. Further, the one or more layer-1 devices 901 can be connected to one another using various architectures, for example, using ring and/or daisy chain architectures having a layer-1 device 901 per wavelength/frequency of transmission and/or reception of data packets and information.

Further examples of the geographical location of layer-1 devices 901 can include, for example, a hut in a remote area of the woods, a poll mounted in a remote location, an underground vault, in a building (for example, in the basement of the building), on every floor (or a predetermined floor) of a building, and/or the like.

In one embodiment, a user of a network using a user device may only be allowed by the network to transmit upstream data and information using a layer-1 device 901. In one embodiment, a given layer-1 device 901 can be configured to receive information and data from several users, for example customers. In another embodiment, the service areas can be configured to service any predetermined number of users having one or more user devices, for example, anywhere from 16 to 500 users (at different homes, floors of a building, and the like) having 1-10 user devices each.

In one embodiment, a layer-3 device 905 can receive and transmit data to two or more different layer-2 devices 903. In another embodiment, layer-2 devices 903 can receive and transmit data to two or more different layer-1 devices 901. In another embodiment, one or more of the layer-2 devices 903 in communication with the layer-3 devices 905 can be designated as primary device(s) and others can be designated as secondary device(s). This can be performed for example, using a Link Aggregation Group (LAG) protocol.

With the systems and methods disclosed herein, layer-3 devices 905 can be located in first locations, for example, at a Central Office. Layer-2 devices 903 can be located in second location(s), for example, in one or more hubs, and layer-1 devices 901 can be located proximate to users, for example customers.

In various embodiments, for a given layer-3 device 905, there may be 80-100 layer-2 devices 903. Further, for every layer-2 device 903, there may be 32-64 layer-1 devices 901. Further, a layer-3 device 905 can connect to more than one layer-2 devices 903. Further, layer-2 devices 903 can coordinate the transfer of data and information between one another, for example in the form of timing protocols so that only one layer-1 device 901 is communicating at a time to the layer-2 device 903.

In various embodiments, the data paths for the traffic flow between the layer-1, 2, and/or 3 devices can be optimized. For example, Border Gateway Protocol (BGP), Resource Reservation Protocol (RSVP), Multiprotocol Label Switching (MPLS) protocols, or any other suitable protocol can be used to optimize the traffic flow. Further, dynamic traffic engineering can be performed on one or more layer-1, layer-2, and/or layer-3 devices based on the load on any given part of the network.

In one embodiment, the optimization of traffic flow on the network associated with the layer-1, layer-2, and layer-3 devices can be performed, in various embodiments, in one or more layer-2 devices 903, for example using Border Gateway Protocol (BGP), Resource Reservation Protocol (RSVP), Multiprotocol Label Switching (MPLS) protocols, and/or the layer distribution protocol (LDP). In one embodiment, this can involve adding and/or removing one or more information labels (for example, a label in a data frame associated with the data packets), for example, in one or more headers associated with the data packets sent and received by the layer-2 device. Further traffic engineering can be performed in the layer-3 device 905, for example, using one or more aggregation routing algorithms.

In one embodiment, the layer-3 device(s) 905 can have visibility and access to all traffic, data, and information being transmitted to and from connected layer-2 devices 903. As a result the layer-3 devices 905 can route the packets efficiently using one or more protocols and/or using information about the traffic, data, and information being transmitted to and from layer-2 devices 903. For example, the layer-3 devices 905 can determine that if a layer-2 device is using a given port, for example, Port 80, the nature of the data traffic is a webpage or that, for Port 443, the nature of the data traffic is a secure webpage. The layer-3 devices 905 can determine that as long as latency considerations are maintained in the transference of data packets throughout the network (for example, if the latency is in the approximately 400-500 millisecond range), that there will not be tangible effect on the data transmissions of the network. For example, if the layer-3 device 905 (for example, a router) is in Atlanta, Ga. and a user associated with a layer-1 device 901 is located in Pensacola, Fla., the layer-3 device 905 can determine that traffic can be routed through a layer-2 device 903 through Chicago because the delay introduced by the additional routing may only introduce approximately a 20-40 extra milliseconds delay, which may be determined to be inconsequential. However, if the traffic is to be routed through California, it may introduce an approximately 100 millisecond (or more) delay, which may cause customers to notice a lag, for example, when a given webpage loads. Alternatively, for other data types (for example video) other delay considerations may be taken into account by the layer-3 device(s) 905. For example, video traffic may be latency insensitive but jitter sensitive. For example, for IP video, the layer-2 devices 903 and/or layer-1 devices 901 may only be asking for data about every 10 seconds to fill one or more internal buffers of the layer-1 devices 901. As the buffer is emptying (for example as the video is being played on customer's device), a user's device may send another request (for example, through the layer-1 device 901 to the layer-2 device 903, and ultimately, to the layer-3 device 905), for which the layer-3 device 905 can determine and communicate another approximately 10 seconds of downstream data transmission through the layer-2 device 903 to the layer-1 device 901, and ultimately, to the user's device.

In various embodiments, described herein are systems and methods for data serialization between layer-1 and layer-2 devices. In one embodiment, in a downstream communication a layer-1 device 901 can determine the information onto the physical medium (for example, a wire). The determination can be made, for example, using information and/or instructions from layer-2 devices 903, for example, instructions to modulate the data on a 711 MHz carrier signal on a predetermined channel. The instructions from the layer-2 device 903, can, in one embodiment, comprise header information in the one or more data packets associated with the data and/or information (for example, data packets). For example, in the case of a passive optical network (PON), the header information can be configured to instruct the layer-1 device 901 to modulate a first data stream on a predetermined wavelength (for example 1490 nanometer (nm) wavelength for downstream traffic and 1310 nm wavelength for upstream traffic). As another example, for networks (for example cable networks) implementing a DOCSIS management module, header information associated with the data packets sent and received from one or more layer-1 devices can be configured to instruct a layer-1 device 901 to modulate a first data stream on a predetermined frequency (for example, approximately 5 to approximately 85 MHz).

In one embodiment, the systems and methods disclosed herein can be used for a multi-user broadcast protocol. In another embodiment, the systems and methods disclosed herein can be used for a single-user upstream protocol. In another embodiment, the systems and methods disclosed herein can be used for a multi-user upstream protocol using synchronization. For example, a synchronized code division multiple access (SCDMA) method can be used, such that timing information (for example, a clock message) can be periodically transmitted (for example, approximately every 200 milliseconds) by the layer-2 device(s) 903 to the layer-1 device(s) 901. One or more receiving devices (for example, layer-1 device(s) 901) can set their timing according to the transmitted timing information. If there are further delays in the transmission, for example, if there are jitters in the upstream transmission, the layer-2 device(s) 903 can determine a drift associated with the difference between the actual transmitted time and the expected transmission time. The layer-2 device or devices 903 can then determine a correction factor to apply for further time synchronization. In various embodiments, the layer-1 and layer-2 device(s) can use a Precision Time Protocol (for example an IEEE 1588 standard) for the time synchronization.

IV. Additional Implementation Details

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, for example a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (for example multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example an FPGA (field programmable gate array) or an ASIC (application-specific integrated circuit). The apparatus can also include, in addition to hardware, code that creates an execution environment for the computer program in question, for example code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (for example one or more scripts stored in a markup language document), in a single file dedicated to the program in question, or in multiple coordinated files (for example files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, for example magnetic, magneto-optical disks, or optical disks. However, a computer need not have such devices. Devices suitable for storing computer program instructions and information/data include all forms of non-volatile memory, media and memory devices, including by way of example semiconductor memory devices, for example EPROM, EEPROM, and flash memory devices; magnetic disks, for example internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, for example a CRT (cathode ray tube) or LCD (liquid crystal display) monitor, for displaying information/data to the user and a keyboard and a pointing device, for example a mouse or a trackball, by which the user can provide input to the computer. Other kinds of devices can be used to provide for interaction with a user as well; for example, feedback provided to the user can be any form of sensory feedback, for example visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, for example as an information/data server, or that includes a middleware component, for example an application server, or that includes a front-end component, for example a client computer having a graphical user interface or a web browser through which a user can interact with an implementation of the subject matter described herein, or any combination of one or more such back-end, middleware, or front-end components. The components of the system can be interconnected by any form or medium of digital information/data communication, for example a communication network. Examples of communication networks include a local area network ("LAN") and a wide area network ("WAN"), an inter-network (for example the Internet), and peer-to-peer networks (for example ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (for example an HTML page) to a client device (for example for purposes of displaying information/data to and receiving user input from a user interacting with the client device). Information/data generated at the client device (for example a result of the user interaction) can be received from the client device at the server.

While this specification contains many specific implementation details, these should not be construed as limitations on the scope of any embodiment or of what may be claimed, but rather as descriptions of features specific to particular embodiments. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

V. Conclusion

Many modifications and other embodiments of the disclosure set forth herein will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A system comprising:
a media access control (MAC) layer device, the MAC layer device comprising memory and processing circuitry configured to:
send, from the MAC layer device, first data packets to a physical (PHY) layer device using a first protocol;
receive, at the MAC layer device, second data packets from the PHY device using a second protocol;
create, by the MAC layer device, modulation instructions; and
send, from the MAC layer device, the modulation instructions directly to the PHY device, wherein the modulation instructions are associated with modulating signals according to first parameters, the modulation instructions comprising addressing information specifying a destination for the signals,
wherein the first data packets include information that enables the PHY device to modulate and demodulate signals for transmission over a network, and wherein the PHY device is a separate device from the MAC layer device.

2. The system of claim 1, wherein memory and processing circuitry configured to receive data from a third device, the third device configured to control and monitor routing functions associated with the system using a generic control plane (GCP) protocol.

3. The system of claim 1, wherein the first protocol includes an upstream external PHY interface (UEPI) protocol and the second protocol includes a downstream external PHY interface (DEPI) protocol.

4. The system of claim 1, wherein the MAC layer device is a first MAC layer device, wherein the system comprises a second MAC layer device, wherein the first MAC layer device has lower-Medium Access Control (MAC) functionality, and wherein the second MAC layer device has an upper-MAC functionality.

5. The system of claim 4, wherein the first MAC layer device and the second MAC layer device are in different physical locations.

6. The system of claim 4, wherein the second MAC layer device having the upper-MAC functionality includes upper-MAC functionality that is virtualized in a cloud-based network.

7. The system of claim 1, wherein the first parameters comprise at least one of a modulation frequency and a demodulation frequency.

8. The system of claim 1, wherein the first parameters comprise at least one of a modulation protocol and a demodulation protocol.

9. The system of claim 1, wherein the first parameters comprise synchronization data.

10. The system of claim 1, wherein the MAC layer device and the PHY device are in different physical locations.

11. Non-transitory computer-readable media storing computer-executable instructions which, when executed by one or more processors, cause the one or more processors to perform operations comprising:
modulating and demodulating signals, by the one or more processors on a physical (PHY) layer device, for transmission over a network, the one or more processors of the PHY layer device being in communication with one or more processors of a media access control (MAC) layer device;
identifying, by the one or more processors of the PHY layer device, first data packets received directly from the MAC layer device using a first protocol, wherein the first data packets include modulation instructions that enable the one or more processors of the PHY layer device to modulate signals according to first parameters, the modulation instructions further comprising addressing information specifying a destination for the signals, and wherein the modulation instructions were created by the MAC layer device; and sending, by the one or more processors of the PHY layer device, second data packets to the MAC layer device using a second protocol.

12. The non-transitory computer-readable media of claim 11, further comprising:
controlling and monitoring, by one or more processors of the PHY layer device in communication with the one or more processors of the MAC layer device, routing functions associated with the network.

13. The non-transitory computer-readable media of claim 12, wherein the controlling and monitoring is performed using a generic control plane (GCP) protocol.

14. The non-transitory computer-readable media of claim 11, wherein the first protocol includes a DEPI protocol and the second protocol includes an UEPI protocol.

15. The non-transitory computer-readable media of claim 11, wherein the MAC layer device includes a first MAC layer device having a lower-MAC functionality and a second MAC layer device having an upper-MAC functionality.

16. The non-transitory computer-readable media of claim 11, further comprising:
demodulating signals and providing data associated with the demodulated signals, by the one or more processors of the MAC layer device, to the PHY layer device.

17. The non-transitory computer-readable media of claim 11, wherein the first parameters comprise at least one of a modulation frequency and a demodulation frequency.

18. The non-transitory computer-readable media of claim 11, wherein the first parameters comprise at least one of a modulation protocol and a demodulation protocol.

19. The non-transitory computer-readable media of claim 11, wherein the first parameters comprise synchronization data.

20. A method comprising:
modulating and demodulating signals, by a physical (PHY) layer device, for transmission over a network, the PHY layer device being in communication with a media access control (MAC) layer device; and
identifying, by the PHY layer device, first data packets received directly from the MAC layer device using a first protocol, wherein the first data packets include instructions to the PHY layer device to modulate signals according to first parameters, the instructions further comprising addressing information specifying a destination for the signals, and wherein the instructions were created by the MAC layer device; and
sending, by the PHY layer device, second data packets to the MAC layer device using a second protocol.

21. The method of claim 20, wherein the first protocol includes a DEPI protocol and the second protocol includes a UEPI protocol.

22. The method of claim 20, wherein the MAC layer device includes a first MAC layer device having a lower-MAC functionality and a second MAC layer device having an upper-MAC functionality.

23. The method of claim 20, further comprising:
controlling and monitoring, by the PHY layer device in communication with the MAC layer device, routing functions associated with the network, the controlling and monitoring performed using a GCP protocol.

24. The method of claim 20, further comprising:
demodulating signals and providing data associated with the demodulated signals, by the PHY layer device, to the MAC layer device.

* * * * *